(12) United States Patent
Murray et al.

(10) Patent No.: US 9,846,914 B1
(45) Date of Patent: Dec. 19, 2017

(54) SYSTEMS, METHODS, AND PROGRAM PRODUCTS FOR CALCULATING SHARED SAVINGS FOR A SELF-INSURED HEALTH CARE PLAN

(71) Applicant: Northwell Health, Inc., Great Neck, NY (US)

(72) Inventors: Alan J. Murray, Syosset, NY (US); Joseph F. Molloy, North Massapequa, NY (US)

(73) Assignee: NORTHWELL HEALTH, INC., Great Neck, NY (US)

( * ) Notice: Subject to any disclaimer, the term of this patent is extended or adjusted under 35 U.S.C. 154(b) by 333 days.

(21) Appl. No.: 14/310,919

(22) Filed: Jun. 20, 2014

Related U.S. Application Data

(60) Provisional application No. 61/837,512, filed on Jun. 20, 2013, provisional application No. 61/870,317, filed on Aug. 27, 2013.

(51) Int. Cl.
*G06Q 40/00* (2012.01)
*G06Q 40/08* (2012.01)
*G06Q 30/02* (2012.01)

(52) U.S. Cl.
CPC ......... *G06Q 40/08* (2013.01); *G06Q 30/0207* (2013.01)

(58) Field of Classification Search
CPC ...................................................... G06Q 40/00
USPC ................................................. 705/35, 36 R
See application file for complete search history.

(56) References Cited

U.S. PATENT DOCUMENTS

| | | | | |
|---|---|---|---|---|
| 6,009,402 | A | 12/1999 | Whitworth | |
| 6,012,035 | A * | 1/2000 | Freeman, Jr. | G06F 19/328 235/379 |
| 6,324,516 | B1 * | 11/2001 | Shults | G06F 19/328 705/2 |
| 6,826,536 | B1 * | 11/2004 | Forman | G06F 19/328 705/3 |
| 6,934,692 | B1 * | 8/2005 | Duncan | G06Q 20/10 705/14.4 |
| 7,340,401 | B1 * | 3/2008 | Koenig | G06F 19/328 600/300 |

(Continued)

FOREIGN PATENT DOCUMENTS

WO 2012125236 A2 9/2012

OTHER PUBLICATIONS

Article "Shared-Savings Payment Arrangements in Health Care, Six Case Studies" by Michael Bailit, Christine Hughes, Megan Burns and David Freedman Aug. 2012.*

(Continued)

*Primary Examiner* — Kirsten Apple
(74) *Attorney, Agent, or Firm* — Amster, Rothstein & Ebenstein LLP

(57) ABSTRACT

A computer implemented method and system is provided for managing one or more self-insured plans, where healthcare provider's discount rate may be dynamically or retroactively adjusted during each plan period based at least in part on, for example, the rate of utilization of in-network or in-system providers by a plurality of respective plan participants. In exchange for the discounts on its services, shared savings may be calculated and paid to the provider after the end of each plan period based at least in part on lower than expected claims.

15 Claims, 7 Drawing Sheets

(56) References Cited

U.S. PATENT DOCUMENTS

| | | |
|---|---|---|
| 7,346,522 B1 | 3/2008 | Baylor et al. |
| 7,356,516 B2 * | 4/2008 | Richey ................ G06Q 10/087 705/14.51 |
| 7,389,245 B1 | 6/2008 | Ashford et al. |
| 7,395,219 B2 * | 7/2008 | Strech .................... G06Q 40/08 705/4 |
| 7,467,094 B2 * | 12/2008 | Rosenfeld ............. G06F 19/327 340/539.12 |
| 7,657,441 B2 * | 2/2010 | Richey ................ G06Q 10/087 705/1.1 |
| 7,739,131 B1 | 6/2010 | Luedtke |
| 7,890,356 B1 | 2/2011 | Drucker et al. |
| 7,912,739 B2 | 3/2011 | Colley et al. |
| 7,941,356 B2 | 5/2011 | Moore et al. |
| 7,974,900 B2 | 7/2011 | Moore et al. |
| 8,019,627 B2 | 9/2011 | Baylor et al. |
| 8,145,500 B2 | 3/2012 | Matisonn et al. |
| 8,160,897 B1 | 4/2012 | Lash |
| 8,195,482 B2 | 6/2012 | Darling et al. |
| RE43,550 E | 7/2012 | Terrance Moore et al. |
| 8,224,668 B2 | 7/2012 | Lash |
| 8,275,638 B1 | 9/2012 | Luedtke |
| 8,428,977 B1 | 4/2013 | Luedtke |
| 8,527,292 B1 * | 9/2013 | Ozden .................... G06Q 30/04 705/2 |
| 8,571,889 B2 | 10/2013 | Ashford |
| 2001/0037214 A1 | 11/2001 | Raskin et al. |
| 2002/0077867 A1 * | 6/2002 | Gittins .................. G06Q 30/02 705/4 |
| 2002/0184057 A1 * | 12/2002 | Hayashi ................ G06Q 40/08 705/4 |
| 2003/0130873 A1 * | 7/2003 | Nevin .................... G06F 19/328 705/3 |
| 2003/0225690 A1 * | 12/2003 | Eaton .................... G06Q 30/04 705/40 |
| 2003/0233292 A1 * | 12/2003 | Richey ................ G06Q 10/087 705/28 |
| 2004/0153382 A1 * | 8/2004 | Boccuzzi ............. G06Q 30/04 705/34 |
| 2007/0007335 A1 * | 1/2007 | Cracchiolo ........... G06Q 40/08 235/380 |
| 2007/0011025 A1 * | 1/2007 | Cracchiolo ........... G06Q 20/10 705/2 |
| 2007/0011088 A1 * | 1/2007 | Cracchiolo ........... G06Q 20/06 705/39 |
| 2007/0118413 A1 | 5/2007 | Javors et al. |
| 2007/0162308 A1 | 7/2007 | Peters |
| 2007/0185803 A1 * | 8/2007 | Harrison ............. G06F 19/328 705/36 T |
| 2007/0194108 A1 * | 8/2007 | Kalappa ................ G06Q 40/00 235/381 |
| 2007/0194109 A1 * | 8/2007 | Harrison ................ G06Q 20/20 235/381 |
| 2007/0208594 A1 * | 9/2007 | Yang ..................... G06F 19/328 705/2 |
| 2007/0276203 A1 | 11/2007 | Day |
| 2007/0294115 A1 * | 12/2007 | Loeb ..................... G06Q 40/02 705/4 |
| 2008/0059351 A1 * | 3/2008 | Richey ................ G06Q 10/087 705/35 |
| 2008/0109263 A1 * | 5/2008 | Clark .................... G06Q 40/08 705/4 |
| 2008/0114620 A1 | 5/2008 | Donnelli |
| 2008/0167901 A1 | 7/2008 | Betz |
| 2008/0300923 A1 | 12/2008 | Theophilos |
| 2009/0006141 A1 | 1/2009 | Karr |
| 2009/0144082 A1 * | 6/2009 | Selbst .................... G06Q 50/22 705/2 |
| 2009/0216567 A1 | 8/2009 | Dust et al. |
| 2009/0276249 A1 | 11/2009 | Dust et al. |
| 2010/0030579 A1 | 2/2010 | Dhauvan |
| 2010/0070409 A1 * | 3/2010 | Harrison ............. G06F 19/328 705/39 |
| 2010/0235194 A1 | 9/2010 | Luedtke |
| 2011/0119082 A1 | 5/2011 | Drucker et al. |
| 2011/0131072 A1 | 6/2011 | Colley et al. |
| 2012/0072241 A1 * | 3/2012 | Krause .................. G06Q 40/08 705/4 |
| 2012/0179489 A1 | 7/2012 | Gupta |
| 2012/0185275 A1 * | 7/2012 | Loghmani ............. G06F 19/328 705/3 |
| 2012/0303380 A1 | 11/2012 | Baylor et al. |
| 2012/0310662 A1 | 12/2012 | Moore et al. |
| 2013/0035953 A1 | 2/2013 | Schoenberg |
| 2013/0090941 A1 | 4/2013 | Taylor et al. |
| 2013/0117033 A1 | 5/2013 | Mohlenbrock |
| 2016/0132644 A1 * | 5/2016 | Kido .................. G06Q 30/0207 705/3 |

OTHER PUBLICATIONS

Bailit, et al., Key Design Elements of Shared-Savings Payment Arrangements, dated Aug. 2011. See also, http://www.commonwealthfund.org/~media/Files/Publications/Issue%20Brief/2011/Aug/1539_Bailit_key_design_elements_sharedsavings_ib_v2.pdf.

James C. Robinson, Accountable Care Organization for PPO Patients, dated 2011. See also http://www.iha.org/ACOWhitePaper_PPO_final.pdf.

Siia, Understanding Self-Insured Group Health Plans, dated Dec. 31, 2013. See also http://www.hcc.com/portals/0/subsites/hcclife/downloads/HealthCareSuccessPublicationl.pdf.

* cited by examiner

SYSTEMS, METHODS, AND PROGRAM PRODUCTS FOR CALCULATING SHARED SAVINGS FOR A SELF-INSURED HEALTH CARE PLAN

CROSS REFERENCE TO RELATED APPLICATIONS

This application claims priority under 35 U.S.C. §119(e) to U.S. Provisional Patent Application Ser. No. 61/837,512, filed on Jun. 20, 2013, and U.S. Provisional Patent Application Ser. No. 61/870,317, filed on Aug. 27, 2013, the contents of all of which are incorporated by reference herein in their entirety.

FIELD

The present invention generally relates to systems, methods and program products relating to funding and managing a self-insured health care plan.

BACKGROUND

Employers, unions, or other group entities that provide their members (e.g., employees, union members) with health benefit plans typically do so under either fully-insured plans or self-insured plans, including but not limited to fully self-insured, level-funded, and minimum premium plans. Plans for employees who are entitled to benefits under a Collective Bargaining Agreement may access benefits through various funding arrangements, including but not limited to employer-sponsored plans, multiple employer welfare arrangements (MEWA), and Taft-Hartley trusts, to name a few. Under a fully-insured plan, an insurance company (e.g., UnitedHealthcare) assumes the risk associated with paying employees' covered medical expenses in exchange for monthly per-employee premiums from an employer (e.g., plan sponsor) and its employees (e.g., plan participants).

On the other hand, under a self-insured plan (also called self-funded health plan), a plan sponsor (e.g., an employer, a union) assumes the responsibility of paying employees' covered medical expenses (e.g., claims). Plan sponsors of self-insured plans often contract with a third-party administrator (TPA) to manage the plan (e.g., processing claims). Typically, an insurance company is contracted as a TPA to administer self-insured plans. In addition, many plan sponsors of self-insured plans seek to mitigate the risk of unexpectedly large or catastrophic claims over a certain threshold level by purchasing stop-loss or stop-gap coverage from an insurance carrier.

Under some self-insured plans (commonly referred to as "level funding arrangements"), the plan sponsor pays monthly "premium equivalents," which are used to pay claims and cover fixed expenses such as stop-loss premiums, TPA fees, PPO access fees and other plan expenses. At the end of each plan year, if there are any funds left over from the plan sponsor's payments, they can either remain in an employer-established account to be used to pay future claims, or be refunded to the plan sponsor.

In some other self-funded arrangements, the employer/plan sponsor pays each medical claim directly as it is billed and remits payment to a health care provider ("provider") from a dedicated account.

SUMMARY

The present invention generally relates to system, method and program products for calculating shared savings for one or more self-insured plans.

At least one embodiment of the present invention relates to a system, method, and program product for funding and managing one or more self-insured plans, where shared savings may be calculated and paid to, for example, a health care provider at the end of each plan period based at least in part on lower than expected claims in exchange for the provider's discounts on its services. To calculate shared savings, a notional target value such as a targeted medical expense amount may be set at or before the beginning of a plan period. In embodiments, the targeted medical expense amount may be based at least in part on a maximum claims liability for each group covered under a shared savings arrangement. In embodiments, the targeted medical expense amount may also be negotiable between the plan sponsor and the provider. If the total claims incurred during the plan period are less than the targeted medical expense amount, a surplus based at least in part on their difference may be shared at least in part with the provider in the form of shared savings.

In embodiments, the provider may be able to change its discount rate during the plan period to optimize the shared savings. In embodiments, the provider's portion in shared savings and/or the provider's discount rate may be adjusted based at least in part on, for example, the degree of plan participants' utilization of the provider's services.

In embodiments, instead of setting its discount rate up front at the beginning of each plan period, the provider determines a discount rate after a pre-set time period based at least in part on, for example, the in-network or in-system utilization by the plan participants during the period. The determined discount rate may then be applied to the provider's claims incurred during the period, and the discounted amounts may then be subtracted from the provider's pending claims to the plan sponsor or refunded to the plan sponsor if the provider's claims have already been paid by the plan sponsor.

At least one embodiment of the present invention relates to a computer implemented method comprising the steps of maintaining, by a computer system including at least one computer, a database stored in a memory comprising (1) electronic claims data related to claims incurred by a plurality of respective plan participants in a self-insured plan, (2) electronic utilization data related to utilization of in-network or in-system providers by the plurality of respective plan participants, (3) electronic targeted medical expense data related to a targeted medical expense amount for a plan period of the self-insured plan, and (4) electronic provider discount rate data related to a provider discount rate; setting, by the computer system, the targeted medical expense amount; after each one of one or more portions of the plan period, adjusting, by the computer system, the provider discount rate based at least in part on one or more of the utilization data and the claims data corresponding to the each one of one or more portions of the plan period; and adjusting, by the computer system, the claims incurred by the plurality of respective plan participants during the each one of one or more portions of the plan period based at least in part on the corresponding adjusted provider discount rate.

In a further embodiment, the computer implemented method further comprises the steps of, after the end of the plan period, calculating, by the computer system, the sum of the claims, including the adjusted claims, incurred by the plurality of respective plan participants during the plan period; comparing, by the computer system, the sum with the targeted medical expense amount to calculate a surplus; and determining, by the computer system, shared savings based at least in part on the surplus.

In a further embodiment, the utilization data is collected by the computer system based at least in part on one or more of the plan participants' claim counts involving the in-network or in-system providers, the plan participants' claim volume involving the in-network or in-system providers, the number of the plan participants' hospitalizations involving the in-network or in-system providers, the number of the plan participants' visits to the in-network or in-system providers, and the number of the plan participants using the in-network or in-system providers compared to the number of the plan participants not using the in-network or in-system providers.

In a further embodiment, the one or more portions of the plan period comprise two or more equally divided time periods encompassing the plan period.

In a further embodiment, the step of setting the targeted medical expense amount comprises the steps of determining, by the computer system, one or more of a maximum claims liability and an expected claims amount; and adjusting, by the computer system, the targeted medical expense amount for the plan period based at least in part on the one or more of a maximum claims liability and an expected claims amount.

In a further embodiment, the computer implemented method further comprises the step of collecting the utilization data in real time during the plan period.

In a further embodiment, the computer implemented method further comprises the steps of, during the plan period, collecting, by the computer system, the claims data; at each time in one or more points during the plan period, calculating, by the computer system, an expected claims value for the plan period based at least in part on the subtotal of the claims data collected to date; calculating, by the computer system, a projected value of shared savings by comparing the expected claims value with the targeted medical expense amount; and adjusting, by the computer system, the provider discount rate based at least in part on the projected value of shared savings.

Furthermore, at least one embodiment of the present invention relates to a computer implemented method comprising the steps of maintaining, by a computer system including at least one computer, a database stored in a memory comprising (1) electronic claims data related to claims incurred by a plurality of respective plan participants in a self-insured plan, (2) electronic utilization data related to utilization of in-network or in-system providers by the plurality of respective plan participants, (3) electronic targeted medical expense data related to a targeted medical expense amount for a plan period of the self-insured plan, and (4) electronic provider discount rate data related to a provider discount rate; setting, by the computer system, the targeted medical expense amount; during the plan period, obtaining, by the computer system, data related to each one of claims incurred by the plurality of respective plan participants; adjusting, by the computer system, the provider discount rate to be applied to the each one of the claims based at least in part on one or more of the utilization data and the claims data retrieved from the database; and adjusting, by the computer system, the each one of the claims based at least in part on the corresponding adjusted provider discount rate.

In a further embodiment, the computer implemented method further comprises the steps of, after the end of the plan period, calculating, by the computer system, the sum of the adjusted claims incurred by the plurality of respective plan participants during the plan period; comparing, by the computer system, the sum with the targeted medical expense amount to calculate a surplus; and determining, by the computer system, shared savings based at least in part on the surplus.

In a further embodiment, the utilization data is collected by the computer system based at least in part on one or more of the plan participants' claim counts involving the in-network or in-system providers, the plan participants' claim volume involving the in-network or in-system providers, the number of the plan participants' hospitalizations involving the in-network or in-system providers, the number of the plan participants' visits to the in-network or in-system providers, and the number of the plan participants using the in-network or in-system providers compared to the number of the plan participants not using the in-network or in-system providers.

In a further embodiment, the step of setting the targeted medical expense amount comprises the steps of determining, by the computer system, one or more of a maximum claims liability and an expected claims amount; and adjusting, by the computer system, the targeted medical expense amount for the plan period based at least in part on the one or more of a maximum claims liability and an expected claims amount.

In a further embodiment, the computer implemented method further comprises the step of collecting the utilization data in real time during the plan period.

In a further embodiment, the computer implemented method further comprises the steps of, during the plan period, collecting, by the computer system, the claims data; at each time in one or more points during the plan period, calculating, by the computer system, an expected claims value for the plan period based at least in part on the subtotal of the claims data collected to date; calculating, by the computer system, a projected value of shared savings by comparing the expected claims value with the targeted medical expense amount; and adjusting, by the computer system, the provider discount rate based at least in part on the projected value of shared savings.

In addition, at least one embodiment of the present invention relates to a computer system comprising one or more memories, one or more processors operatively connected to the one or more memories, and one or more computer readable media operatively connected to the one or more processors and having stored thereon computer instructions for carrying out the steps of maintaining, by the computer system, a database stored in the one or more memories, the database comprising (1) electronic claims data related to claims incurred by a plurality of respective plan participants in a self-insured plan, (2) electronic utilization data related to utilization of in-network or in-system providers by the plurality of respective plan participants, (3) electronic targeted medical expense data related to a targeted medical expense amount for a plan period of the self-insured plan, and (4) electronic provider discount rate data related to a provider discount rate; setting, by the computer system, the targeted medical expense amount; during the plan period, obtaining, by the computer system, data related to each one of claims incurred by the plurality of respective plan participants; adjusting, by the computer system, the provider discount rate to be applied to the each one of the claims based at least in part on one or more of the utilization data and the claims data retrieved from the database; and adjusting, by the computer system, the each one of the claims based at least in part on the corresponding adjusted provider discount rate.

In a further embodiment, the computer instructions further carry out the steps of, after the end of the plan period, calculating, by the computer system, the sum of the adjusted claims incurred by the plurality of respective plan participants during the plan period; comparing, by the computer system, the sum with the targeted medical expense amount to calculate a surplus; and determining, by the computer system, shared savings based at least in part on the surplus.

In a further embodiment, the utilization data is collected by the computer system based at least in part on one or more of the plan participants' claim counts involving the in-network or in-system providers, the plan participants' claim volume involving the in-network or in-system providers, the number of the plan participants' hospitalizations involving the in-network or in-system providers, the number of the plan participants' visits to the in-network or in-system providers, and the number of the plan participants using the in-network or in-system providers compared to the number of the plan participants not using the in-network or in-system providers.

In a further embodiment, the step of setting the targeted medical expense amount comprises the steps of determining, by the computer system, one or more of a maximum claims liability and an expected claims amount; and adjusting, by the computer system, the targeted medical expense amount for the plan period based at least in part on the one or more of a maximum claims liability and an expected claims amount.

In a further embodiment, the computer instructions further carry out the step of collecting the utilization data in real time during the plan period.

In a further embodiment, the computer instructions further carry out the steps of, during the plan period, collecting, by the computer system, the claims data; at each time in one or more points during the plan period, calculating, by the computer system, an expected claims value for the plan period based at least in part on the subtotal of the claims data collected to date; calculating, by the computer system, a projected value of shared savings by comparing the expected claims value with the targeted medical expense amount; and adjusting, by the computer system, the provider discount rate based at least in part on the projected value of shared savings.

These and other features of the present invention are described in, or are apparent from the following detailed description of various exemplary embodiments of the invention.

BRIEF DESCRIPTION OF THE DRAWINGS

The above and related objects, features and advantages of the present invention will be more fully understood by reference to the following, detailed description of the preferred, albeit illustrative and exemplary, embodiments of the present invention when taken in conjunction with the accompanying figures, wherein.

DETAILED DESCRIPTION

Figure 1:
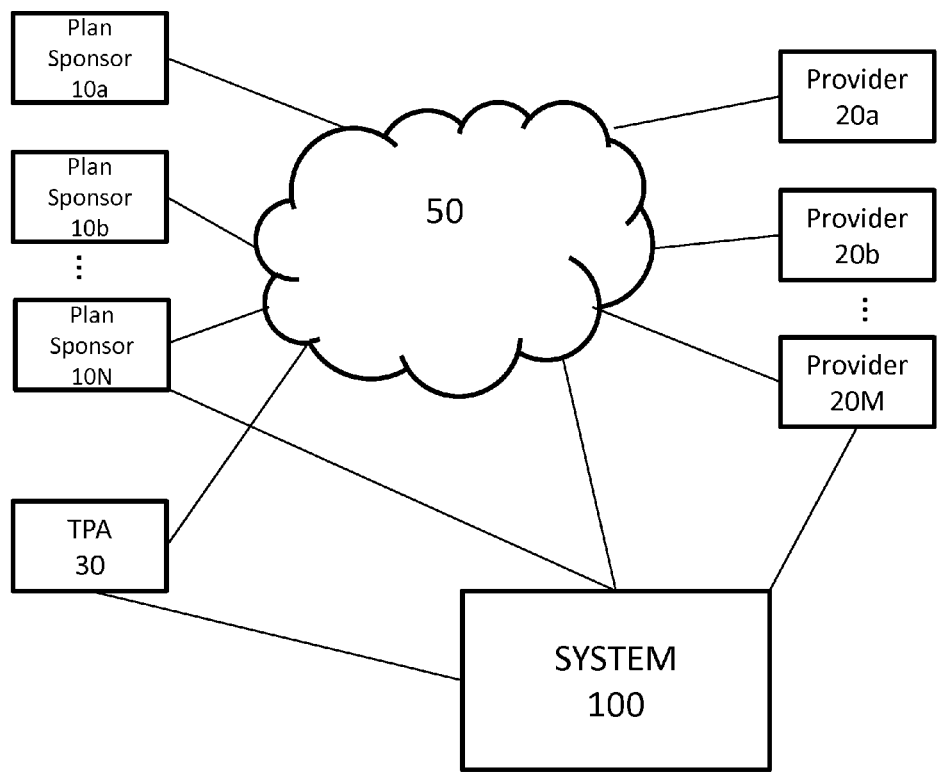
FIGS. 1 and 1A are schematic representations illustrating a system according to exemplary embodiments of the present invention.

The present invention generally relates to system, method and program product for calculating shared savings for a self-insured plan. Embodiments of the present invention relate to a new form of self-insured plan in which a plan sponsor may be incentivized to direct a volume of plan participants toward a specific health care provider or providers designated by a shared savings arrangement and share savings from lower than expected claims with the provider(s) in exchange for discounts on the services from the provider(s) and/or other economic incentives from the provider(s) (e.g., a discount for all or certain selected in-network or in-system services), preventive treatments, or System-provided health improvement education and engagement programs, to name a few.

In embodiments, a shared savings arrangement may be implemented between one or more plan sponsors for one or more self-insured plans and one or more health care providers, which may, for example, comprise a system or network of hospitals, physicians, ancillary facilities, laboratories, health care related services, and/or Faculty Practice Plan (FPP)/Premium providers, to name a few. The shared savings arrangement may provide for the plan participants to select a primary care physician (PCP) within the Preferred Provider's network. The shared savings arrangement may provide for a third party administrator (TPA) to be appointed to implement the arrangement. The shared savings arrangement may be designed to be renewable every plan year, or some other fixed term (e.g., 2 years, 3 years, 5 years, to name a few) or some variable term (e.g., month-to-month).

The provider may establish a baseline discount rate (e.g., 5%, 10%, 15%) at the beginning of a shared savings arrangement (e.g., the first year of a program) since, for example, the group may be coming out of a fully-insured environment and hence the prior claims, utilization and financial data is not available.

In subsequent plan years (or plan periods) or even during a given plan period, the provider may adjust the discount rate based at least in part on, for example, the in-network or in-system utilization by the plan participants. Such in-network or in-system utilization may be determined based at least in part on, for example, claim count, claim volume, number of hospitalizations, number of visits involving the in-network or in-system resources, and/or number of plan members using the in-network or in-system services compared to the number of members not using the in-network or in-system resources, to name a few. How the in-network or in-system utilization rate is determined may be negotiated between the provider and the plan sponsor.

For example, the provider's discount rate may be set at (i) a first percentage (e.g. 7%) if the utilization of a specified provider by the plan participants is determined to be within a first specified range (e.g., between 50% and 59.9%) as measured in against total medical cost per member per month (PMPM); (ii) a second percentage (e.g., 10%) if the utilization of the specified provider is determined to be within a second specified range (e.g., between 60% and 74.9%) as measured in against total medical cost PMPM; (iii) a third percentage (e.g., 15%) if the utilization of the specified provider is determined to be within a third specified range (e.g., over 75%) as measured in against total medical cost PMPM or some other milestone. In embodiments, a different number of percentages and specified ranges, as well as different amounts, or different milestones may be used or negotiated.

This adjustment of the provider's discount rate based on the in-network or in-system utilization rate may be performed periodically during a given plan period, such as monthly, quarterly, every 6 months, at the end of a plan year, to name a few.

In embodiments, the provider does not set a discount rate up front at the beginning of each plan period. Instead, after a pre-set time period (e.g., every month, every 3 months, every 4 months, every 6 months, at the end of a plan year, to name a few), a discount rate may be determined based at least in part on, for example, the in-network or in-system utilization by the plan participants during this time period. The determined discount rate may then be applied to the provider's claims for this time period. The discounted amounts may then be subtracted from the provider's pending claims to the plan sponsor for this time period or refunded to the plan sponsor if the provider's claims have already been paid by the plan sponsor. Such in-network or in-system utilization may be determined based at least in part on, for example, claim count, claim volume, number of hospitalizations, number of visits involving the in-network or in-system resources, and/or number of plan members using the in-network or in-system services compared to the number of members not using the in-network or in-system resources, to name a few. The in-network or in-system utilization rate may be determined through negotiation between the provider and the plan sponsor.

For example, the provider's discount rate may be determined to be at (i) a first percentage (e.g., 7%) if the utilization of a specified provider by the plan participants is determined to be within a first specified range (e.g., between 50% and 59.9%) as measured in against total medical cost per member per month (PMPM); (ii) a second percentage (e.g., 10%) if the utilization of the specified provider is determined to be within a second specified range (e.g., between 60% and 74.9%) as measured in against total medical cost PMPM; (iii) a third percentage (e.g., 15%) if the utilization of the specified provider is determined to be within a third specified range (e.g., over 75%) as measured in against total medical cost PMPM or some other milestone. The provider's discount rate may be set at a baseline percentage (e.g., 1%, 2%, 5%, to name a few) if the utilization of the specified provider is determined to be below a certain threshold (e.g., 50%) as measured in against total medical cost PMPM. In embodiments, a different number of percentages and specified ranges, as well as different amounts, or different milestones may be used or negotiated.

To calculate shared savings, a notional target value such as targeted medical expense amount (or Global Expected Claims Cost Opportunity) may be set at or before the beginning of a plan period of the self-insured plan. The targeted medical expense amount is used to determine the opportunity for sharing savings among at least the plan sponsor and one or more providers. In some embodiments, the targeted medical expense amount may be determined independent of the determination of the actual funding level for the relevant self-insured plan. In some embodiments, the targeted medical expense amount may be calculated or negotiated between the plan sponsor and the provider based at least in part on at least in part the provider's discount rate (e.g., provider reimbursement rate).

The targeted medical expense amount may be a function of a maximum claims liability for each group covered under a shared savings arrangement. The targeted medical expense amount may be set at the maximum claims liability for the group. The provider may, in consultation with the plan sponsor, its consultant/broker, and/or its stop-loss insurer (if participating in a stop-loss program), consider, for example, demographics, risk profile and/or the past claims experience (e.g., the claims experience for at least the last two years) of the group to establish an expected claims amount and a maximum claims liability, to name a few.

The self-insured plan under a shared savings arrangement may be insured by a stop-loss insurance carrier and have a specific stop-loss level established by the stop-loss insurer on a per claimant basis. The maximum claims liability may be set at the aggregate stop-loss level determined by the stop-loss carrier. If the plan sponsor has not purchased stop-loss insurance for the self-insured plan, then a phantom stop-loss level may be established for purposes of setting the maximum claims liability under a shared savings arrangement.

The targeted medical expense amount may be based at least in part of at least one or more of (1) the provider's discounts on its services (e.g., provider reimbursement rate); (2) the plan sponsor's past claims experience, or actuarially determined anticipated medical expense for the upcoming period; (3) the provider's market share in the relevant geographical location; (4) the group's demographics, including but not limited to age, gender, home zip code, salary, occupation, etc.; or (5) the nature of the group's business and standard industry code (SIC), to name a few. For example, in embodiments, based at least in part on the provider's 20% discount on its services and the provider's 40% market share in the hospital care in the plan sponsor's geographical area, the targeted medical expense amount may be set at 97% of the previous year's medical expense in the first year of the implementation of the system, to name a few. Other formulations may be used to determine and/or get a targeted medical expense for particular plans in a given plan period.

After the end of a plan period (e.g., after a 90-day run-out period following the end of a 1-year plan period), the total amount of claims incurred and/or claims paid during the plan period may be determined. For example, as discussed below, a claims module may be used to make such a determination. To the extent the total amount of claims incurred or claims paid during a plan period is less than the targeted medical expense amount, a surplus based at least in part on their difference may be shared in the form of shared savings at least in part with the provider. The surplus may be shared in the form of shared savings at least in part with the provider and also with the third-party administrator administering the plan, or, for example, also in the form of a distribution of a reserve set-up, based on the targeted medical expense amount specifically for the purpose of allocating shared savings after a final accounting of the plan period. For example, in embodiments, a first percentage (e.g., 50%) of the surplus may be distributed to a plan sponsor, a second percentage (e.g., 45%) of the surplus may be distributed to the provider, and a third percentage (e.g., 5%) of the surplus may be distributed to the TPA, in the form of shared savings after the end of the plan period. The percentage allocation of shared savings to the plan sponsor, the provider, and possibly others (e.g., TPA) may be determined or negotiated in advance of the plan period (e.g., plan year) based at least in part on, for example, the risk profile, demographics, the in-system/in-network utilization rate, and/or the capture rate of the group, to name a few. The provider's portion of shared savings based at least in part on a percentage of the surplus may be capped in terms of total amount.

The percentage allocation of shared savings may be based at least in part on, for example, the in-network or in-system utilization by the plan participants. For example, initially (e.g., in the first year of a shared savings arrangement), the provider may be apportioned a larger share in shared savings (e.g., 15% for the plan sponsor, 80% for the provider, and 5% for the TPA). In subsequent plan periods, data for the in-network or in-system utilization is analyzed and based at least in part on any increase in the in-network or in-system utilization by the plan participants, the percentage allocation of shared savings may be adjusted accordingly (e.g., 50% for the plan sponsor, 45% for the provider, and 5% for the TPA).

A minimum limit (e.g., 45%) on the provider's percentage share in shared savings may be established based at least in part on, for example, the provider's discount rate, the provider's profit and loss analysis, to name a few.

Both the percentage allocation of shared savings and the provider's discount rate may be based at least in part on in-network or in-system utilization. In embodiments, if the percentage allocation of shared savings is based at least in part on the in-network or in-system utilization, then the provider's discount rate is not.

In embodiments, at the end of the reconciliation of each plan period, the plan sponsor pays to the provider, either directly, indirectly, or, for example, through the redistribution of reserves held at the beginning of the plan period, the portion of shared savings allocated to the provider. The provider's portion of the shared savings may be paid to the provider through the TPA for the plan or an administrative services only (ASO) group (e.g., an insurance company functioning as a TPA for the shared savings arrangement).

A shared savings arrangement may assess savings relative to the full set of covered services for the group (e.g., all in-network or in-system services). Certain services may be excluded from the calculation of shared savings based at least in part on, for example, the risk profile and/or demographics of each group. For example, one or more of the following services may be excluded from the shared savings calculation: organ transplants; catastrophic claims above a certain level (e.g., neo-natal infants); prescription medications (e.g., specialty medications) in toto or above a certain threshold; behavioral health; pediatric services; dental services, except for limited services covered by the plan; out-of-area services; and/or non-preventable inpatient and emergency department services, to name a few.

Claims relating to certain types of treatment (e.g., neo-natal infant, organ transplant, to name a few) that may exceed either an aggregate or specific stop-loss point may be excluded from the calculation of shared savings. This flexibility may permit the prevention of a single catastrophic claim from eliminating all or a major portion of the potential shared savings for the plan period. Such arrangement may be made in consultation with the stop-loss carrier for the plan as to how the types of claims to be excluded from the shared savings calculation would attach to the stop-loss liability and how the service discounts under the shared savings program would potentially lower the stop-loss carrier's exposure.

The manners in which shared savings are calculated and the provider's discount rates are determined may be different for different self-insured plans. The manners in which shared savings are calculated and the provider's discount rates are determined may be different for different groups of plan participants within the same self-insured plan.

For a selected group of self-insured plans or plan participants within a self-insured plan, the provider's discount rate may be determined based at least in part on, for example, types of specific treatments or procedures, the Current Procedural Terminology (CPT) codes, bundled payments, and/or services, to name a few. To a certain group of plans or plan participants within a plan, the provider may provide specific procedures (e.g., cardiology, anesthesiology, to name a few) for a discounted bundled payment based at least in part on, for example, the amount of volume requiring such procedures the group brings to the provider. For example, the provider may provide cardiology procedures to a specific group for a discounted bundled payment if the group sends at least a certain percentage (e.g., 100%, 90%, 80%, 50%, to name a few) of those requiring cardiology procedures to the provider. In embodiments, the provider may provide to a specific group, at a later time, a discounted amount for specific procedures performed to the group based at least in part on the amount of volume requiring such procedures the group has brought to the provider.

A specific set of treatments and procedures may be defined to be covered by the provider's discounts. A specific set of treatments and procedures may be defined to be excluded from the provider's discounts. For example, all in-network or in-system services may be covered by the provider's discounts except for a certain set of services such as normal maternity.

Once set at the beginning of the plan period, the targeted medical expense amount, the reserved shared savings amount (if applicable), and/or the provider's discount rate (e.g., the provider reimbursement rate) may remain fixed during the entire plan period. In embodiments, the provider may be allowed to change the rate of discount on its services during a plan period. For example, the provider may monitor real time data of claims incurred to date during the plan period. Based at least in part on the analysis of the data (e.g., calculating a subtotal of claims incurred to date to estimate expected medical expenses for the plan year), the provider may change the rate of discount on its services (e.g., from 20% to 30%) during the plan period so that the targeted medical expense amount is not exceeded by the claims incurred during the plan period. As discussed above, the provider may also adjust the discount rate based at least in part on, for example, the in-network and/or in-system utilization by the plan participants during the plan period. By allowing such flexibility, the present invention may allow optimization of shared savings for both the plan sponsor and the provider. This change of rate of discount may be calculated dynamically and automatically, and either periodically, or upon demand, during the plan period by, for example, one or more computer modules (such as a provider discount rate module 150 in FIG. 2). The rates may also be altered manually and applied to claims as submitted or after the fact to previously submitted claims.

The provider may be able to exclude certain services from a shared savings arrangement during the plan period. The provider may be able to add certain services to the shared savings arrangement during the plan period.

In subsequent plan periods, the targeted medical expense amount may be re-set based at least in part on a calculated maximum claims liability level for the next plan period. In embodiments, the targeted medical expense amount may be re-set at the higher value of either the maximum claims liability for the next plan period calculated based at least in part on analysis and underwriting of the prior plan period's claims experience, or a predetermined percentage (e.g., 104%, 105%, 106%, to name a few) of the prior plan period's maximum claims liability.

For example, for plan period 2 (e.g., year 2 for an annual plan), the targeted medical expense amount may be set at either a calculated maximum claims liability for plan period 2 or a percentage (e.g., 104%, 105%, 106%, to name a few) of the targeted medical expense amount for plan period 1, whichever is higher. Similarly, for plan period 3 (e.g., year 3 for an annual plan), the targeted medical expense amount may be set at either a calculated maximum claims liability for plan period 3 or a percentage (e.g., 104%, 105%, 106%, to name a few) of the targeted medical expense amount for plan period 2, whichever is higher. Where a shared savings arrangement is set up for a multi-year period (e.g., 3 years), the targeted medical expenses may be adjusted during a sub-period (e.g., each year). Where a shared savings arrangement is set up for a multi-year period (e.g., 3 years), the targeted medical expenses may remain the same for the entire multi-year period (e.g., the 3 years).

The targeted medical expense module 130 may establish the minimum percentage (e.g., 104%) and require that the subsequent plan year's targeted medical expense amount be at least equal to or greater than the minimum percentage of the prior plan year's targeted medical expense amount.

In subsequent plan periods, the targeted medical expense amount may be re-set by increasing the value of the prior year's targeted medical expense amount by some predictable amount (e.g., 4%, 5%, or 10%, etc. increase per year). The targeted medical expense amount may be re-negotiated between the plan sponsor and the provider or re-calculated automatically or manually at the end of each plan year, or other specified period, based at least in part on changes or adjustments in the provider's discount rate, the plan sponsor's claims experience, and/or the provider's market share.

In embodiments, the present invention may be implemented by one or more computers, or a network of server and client machines, or other available configurations of automated systems. FIG. 1 shows, according to an exemplary embodiment, a system diagram including a system generally designated by number 100. The system 100 can operatively connect to one or more plan sponsors 10a, 10b, . . . 10N (hereinafter, collectively or individually designated by number 10) for one or more self-insured plans and one or more health care providers 20a, 20b, . . . 20M (hereinafter, collectively or individually designated by number 20). In embodiments, the system 100 may also operatively connect to a third party administrator (TPA) 30 who is appointed to implement the shared savings arrangement.

Figure 1A:
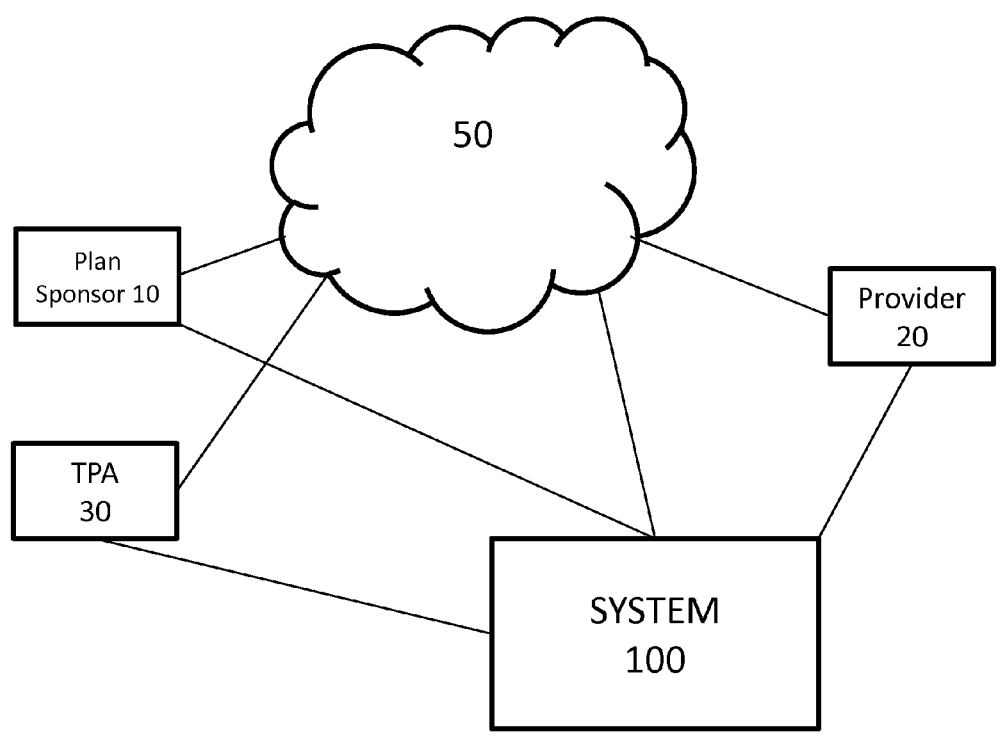

FIG. 1A shows, according to an exemplary embodiment, a system diagram including a system operatively connected to one plan sponsor 10, one provider 20, and a TPA 30.

As shown in FIG. 1 and FIG. 1A, the system 100 may connect directly or indirectly to the plan sponsor(s) 10, provider(s) 20, and TPA 30. The system 1 may operatively connect with one or more networks, referenced herein as network 50 for convenience. The network 50 may include, for example, the Internet, a cellular network, WAN, LAN, or other private or public networks.

The plan sponsor(s) 10, provider(s) 20, and/or TPA 30 may interact with the system 100 through devices such as any type of desktop, laptop, smartphone (e.g., iPhone, Android, Windows Phone, Blackberry, to name a few), tablet device (e.g., iPad, iPod, Touch, Kindle, Android, Microsoft Surface, Chrome Book, to name a few), and any other suitable computing device(s). For example, the plan sponsor(s) 10, provider(s) 20, and/or TPA 30 may interact the system 1 and vice versa through a web browser, an application, or any suitable user interface.

Figure 2:
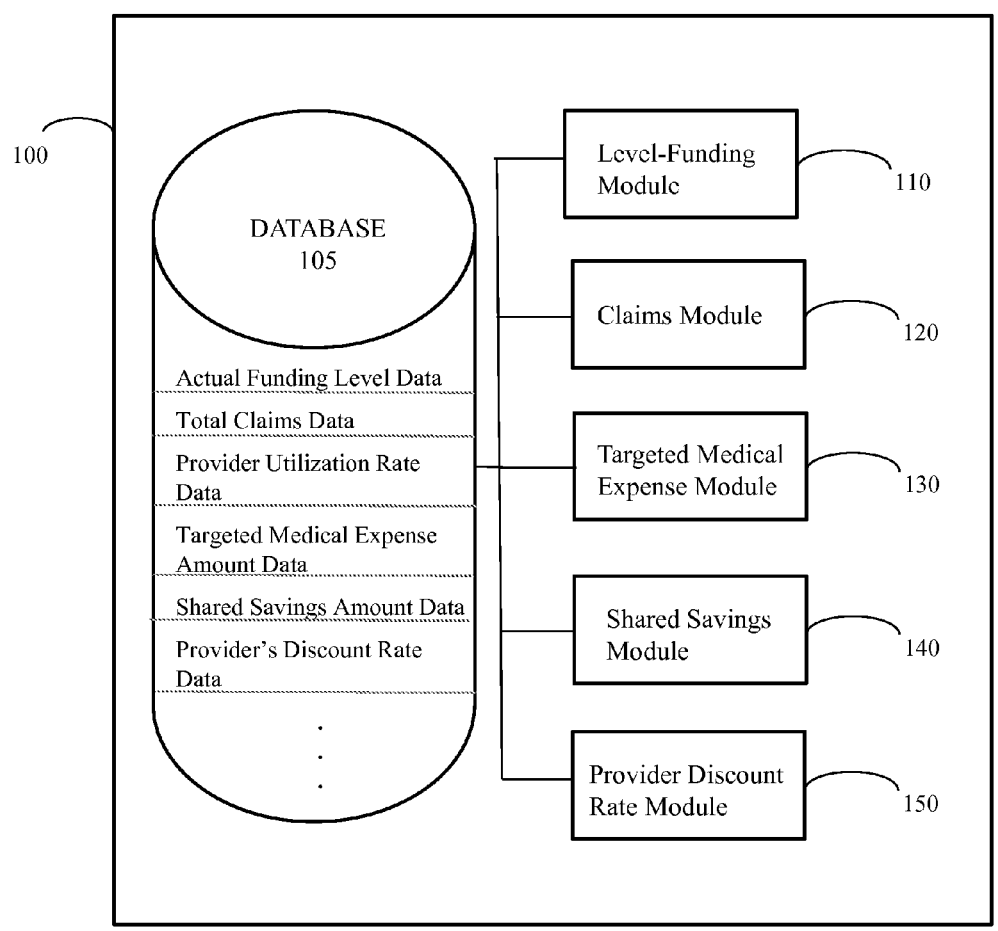
FIG. 2 is a schematic representation of a system according to an exemplary embodiment of the present invention.

FIG. 2 shows, according to an exemplary embodiment, a schematic diagram showing exemplary components or modules of the system 100. The system 100 for calculating shared savings for one or more self-insured plans may comprise one or more databases 105 and various modules, including for example, a level-funding module 110, a claims module 120, a targeted medical expense module 130, a shared savings module 140, and a provider discount rate module 150. These modules may be implemented within a single computer or machine, or in different computers or machines in one or more networks. Each module may be in the form of software or program code stored in memory which is run on one or more processors. As shown in FIG. 2, each module may be operatively connected to one or more other modules and to the database 105. One or more modules in the system 100 may be operatively connected to one or more databases and/or processors inside and/or outside the system 100. One or more of the modules may not be present, such as, for example, the level-funding module 110 and/or the provider discount rate module 150. One or more of the modules may be combined into a single module. Additional modules may also be present to perform other related or unrelated operations. One or more modules may be used at least in part with mobile applications or portable user devices either alone or in conjunction with other applications on one or more remote computers.

The level-funding module 110 may be used to account for the full funding level of a level funding arrangement (e.g., monthly premium equivalents paid by a plan sponsor) under one or more relevant self-insured plans. The level-funding module 110 may be part of same system or a separate system, with the value of the total amount of premium equivalents (e.g., the full funding level of a level-funding arrangement) being provided for use by other modules in the present system 100. The level-funding module 110 may in turn use data provided from the database 105 or other modules in the present system 100 to determine the actual funding level (e.g., an appropriate monthly premium equivalent) for one or more relevant self-insured plans, and may store the value of the actual funding level in the database 105. The full funding level of the level funding arrangement would be higher than the amount of expected claims for the group. The targeted medical expense amount may be set at the maximum claims liability and may become the basis upon which the full funding level of the level funding arrangement (e.g., level-funding premium equivalents) is determined by the level-funding module 110. The level-funding module 110 may set the full funding level of the relevant self-insured plan higher than the targeted medical expense amount set by the targeted medical expense module 130.

The claims module 120 may be used to account for claims incurred and/or claims paid by a plan sponsor under one or more relevant self-insured plans. The claims module 120 may calculate for each self-insured plan a total of claims incurred or claims paid during a predetermined (e.g., annual) period of a plan and may store it in the database 105. The claims module 120 may also provide accounting for claims incurred and/or claims paid during specified periods or parameters in one or more relevant self-insured plans.

The claims module 120 may also collect and/or monitor data relating to the utilization of a specified provider (e.g., its physicians, facilities, services, etc.) by the plan participants, which may be stored in the database 105. The claims modules 120 may collect and/or monitor the utilization data in real time. The claims module 120 may also collect and/or monitor data relating to the utilization of out-of-network providers/services by the plan participants.

The targeted medical expense module 130 may be used to determine a targeted medical expense amount for a given time period for one or more specified self-insured plans, as discussed herein, and may store the value of the targeted medical expense amount in the database 105.

The shared savings module 140 may be used to determine the amount of a shared saving, if any, to be paid under one or more relevant self-insured plans, after a specified time period, as discussed herein, and may store the amount of the shared saving in the database 105.

The provider discount rate module 150 may be used to determine the rate of the provider's discounts on its services, as discussed herein, and may store the rate of the provider's discount in the database 105.

Other modules may be used to perform related or unrelated functions.

The database 105 may store one or more of the following data or calculation results from one or more modules in the system 100 and/or external database: the actual funding level of a plan (e.g., an appropriate monthly premium equivalent), the total amount of claims incurred or paid during a given period (e.g., a plan year), the rate of utilization of a specified provider (e.g., its physicians, facilities, services, to name a few), the targeted medical expense amount, the amount of shared savings, the provider's discount rate at a given time, etc. The database 105 may additionally store other types of data, parameters, information, etc. that are needed for a process or calculation by one or more modules in the system 100.

The database 105 may comprise a single database. In embodiments, the database 105 may comprise multiple databases respectively storing different types of data or calculation results. In embodiments, the database 105 may comprise multiple databases, each of which is associated with the corresponding module (e.g., level-funding module 110, claims module 120, targeted medical expense module 130, shared savings module 140, provider discount rate module 150, etc.) in the system 100.

At the beginning of a shared savings arrangement, a provider discount rate module 150 may establish a baseline discount rate (e.g., 5%, 7%, 10%, 15%, to name a few) for the provider's services.

In subsequent plan periods and/or even during a given plan period, the provider discount rate module 150 may adjust the discount rate based at least in part on, for example, the in-network or in-system utilization by the plan participants. Such in-network or in-system utilization may be determined (e.g., by the claims module 120) based at least in part on, for example, claim count, claim volume, number of hospitalizations, number of visits involving the in-network or in-system resources, and/or number of plan members using the in-network or in-system services compared to the number of members not using the in-network or in-system resources, to name a few. How the in-network or in-system utilization rate is determined may be negotiated between the provider and the plan sponsor.

For example, the provider's discount rate may be set at (i) a first percentage (e.g., 7%) if the utilization of a specified provider by the plan participants is determined to be within a first specified range (e.g., between 50% and 59.9%) as measured in against total medical cost per member per month (PMPM); (ii) a second percentage (e.g., 10%) if the utilization of the specified provider is determined to be within a second specified range (e.g., between 60% and 74.9%) as measured in against total medical cost PMPM; (iii) a third percentage (e.g., 15%) if the utilization of the specified provider is determined to be within a third specified range (e.g., over 75%) as measured in against total medical cost PMPM. A different number of percentages and specified ranges, as well as different amounts, may be used or negotiated.

This adjustment of the provider's discount rate based on the in-network or in-system utilization rate may be performed by the provider discount rate module 150 periodically during a given plan period, such as monthly, quarterly, every 6 months, at the end of a plan year, to name a few.

In embodiments, the provider discount rate module 150 does not set a discount rate up front at the beginning of each plan period. Instead, after a pre-set time period (e.g., every month, every 3 months, every 4 months, every 6 months, at the end of a plan year, to name a few), a discount rate may be determined by the provider discount rate module 150 based at least in part on, for example, the in-network or in-system utilization by the plan participants during this time period. The discount rate determined by the provider discount rate module 150 may then be applied by, for example, the claims module 120 to the provider's claims for this time period. The discounted amounts may then be subtracted (e.g., by the claims module 120) from the provider's pending claims to the plan sponsor for this time period or refunded to the plan sponsor if the provider's claims have already been paid by the plan sponsor. Such in-network or in-system utilization may be determined (e.g., by the claims module 120) based at least in part on, for example, claim count, claim volume, number of hospitalizations, number of visits involving the in-network or in-system resources, and/or number of plan members using the in-network or in-system services compared to the number of members not using the in-network or in-system resources, to name a few. The in-network or in-system utilization rate may be determined by negotiation between the provider and the plan sponsor.

For example, the provider's discount rate may be determined by the provider discount rate module 150 to be at (i) a first percentage (e.g., 7%) if the utilization of a specified provider by the plan participants is determined to be within a first specified range (e.g., between 50% and 59.9%) as measured in against total medical cost per member per month (PMPM); (ii) a second percentage (e.g., 10%) if the utilization of the specified provider is determined to be within a second specified range (e.g., between 60% and 74.9%) as measured in against total medical cost PMPM; (iii) a third percentage (e.g., 15%) if the utilization of the specified provider is determined to be within a third specified range (e.g., over 75%) as measured in against total medical cost PMPM or some other milestone. The provider's discount rate may be set by the provider discount rate module 150 to be at a baseline percentage (e.g., 1%, 2%, 5%, to name a few) if the utilization of the specified provider is determined to be below a certain threshold (e.g., 50%) as measured in against total medical cost PMPM. A different number of percentages and specified ranges, as well as different amounts, or different milestones may be used or negotiated.

The provider discount rate module 150 may keep track of the provider's services to which the discount may or may not apply. The provider discount rate module 150 may exclude certain services from being discounted under a shared savings arrangement. The provider discount rate module 150 may include new services to which the discount may be applied under a shared savings arrangement.

Typically, before the beginning of each plan period, a targeted medical expense amount may be set manually or otherwise determined, such as using a targeted medical expense module 130, as shown in FIG. 2, for each self-insured plan.

The targeted medical expense amount may be based at least in part on a maximum claims liability for each group covered under a shared savings arrangement. The provider may, in consultation with the plan sponsor, its consultant/broker, its stop-loss insurer (if participating in a stop-loss program), consider, for example, demographics, risk profile and/or the past claims experience (e.g., the claims experience for at least the last two years) of the group to establish an expected claims amount and a maximum claims liability, to name a few. Such data or information may be stored in or obtained by the claims module 120, which may then calculate the expected claims amount and the maximum claims liability. The targeted medical expense amount may be calculated by the targeted medical expense module 130 based at least in part on the maximum claims liability calculated by the claims module 120. The targeted medical expense amount may be set at the maximum claims liability calculated by the claims module 120.

In some embodiments, the targeted medical expense amount may be based at least in part on one or more of the following parameters: (1) the provider's discounts on its services (e.g., provider reimbursement rate); (2) the medical expense (e.g., claims incurred or claims paid by the plan sponsor) during the previous plan period, or actuarially determined anticipated medical expense for the upcoming period in the event there is no data from the prior plan period; (3) the provider's market share in the relevant geographical location; (4) the group's demographics, including but not limited to age, gender, home zip code, salary, occupation, etc.; (5) the nature of the group's business and standard industry code (SIC); or (6) member/dependent engagement sponsored health improvement programs offered by the provider, plan sponsor, or an outside vendor, to name a few. For example, in embodiments, based at least in part on the provider's 20% discount on its services and the provider's 40% market share in the hospital care in the plan sponsor's geographical area, the targeted medical expense amount may be set at 97% of the previous year's medical expense in the first year of the implementation of the system. It is also possible, in embodiments, that the targeted medical expense amount can be set to the full funding level of a level funding plan, up to the aggregate stop-loss point. The targeted medical expense amount may also be negotiable between the plan sponsor and the provider and input manually.

For the first year of the implementation of the system, the targeted medical expense amount may be set at a predetermined percentage of the amount of claims incurred or claims paid during the previous plan period, or at a predetermined percentage of actuarially determined anticipated medical expense for the upcoming plan period, to name a few. The targeted medical expense module 130 may obtain claims data from the claims module 120, or otherwise, for the previous plan period from one or more electronic databases (e.g., database 105 in the system 100) storing the data and calculates a sum of all claims incurred or claims paid by the plan sponsor for that period. The targeted medical expense module 130 may use this sum to determine the targeted medical expense amount in accordance with desired parameters. The claims module 120 may determine anticipated medical expense for the upcoming plan period using claims incurred, plan participants' health related information, and/or other information and data that may be predictive of potential health care services anticipated to be needed or registered by the plan participants in the upcoming plan year.

The targeted medical expense amount may be set at 90%, 95%, 97%, 98%, 100%, 105%, or some other percentage of the previous year's claims incurred or claims paid, or the current year's anticipated medical expense. An initial targeted medical expense amount may also be set manually, or determined by the targeted medical expense module 130 in any economically viable manner.

In subsequent years, the targeted medical expense amount may be set or determined using the targeted medical expense module 130 using one or more similar methodologies. The targeted medical expense module 130 may periodically re-set the targeted medical expense amount in a predetermined manner. The targeted medical expense amount may be set or determined by the targeted medical expense module 130 by applying some desired percentage to the previous plan period's targeted medical expense amount. For example, in embodiments, the targeted medical expense amount for plan period 2 (e.g., year 2 for an annual plan) could be 100%, 103%, 105%, 107%, or 110% of the targeted medical expense amount for plan period 1 (e.g., year 1 for an annual plan). The percentage could be the same or different for each plan period.

In subsequent plan periods, the targeted medical expense amount may be re-set by the targeted medical expense module 130 based at least in part on the maximum claims liability level calculated by, for example, the claims module 120 for the next plan period. The targeted medical expense amount may be re-set by the targeted medical expense module 130 at the higher value of either the maximum claims liability for the next plan period calculated by, for example, the claims module 120 based at least in part on analysis and underwriting of the prior plan period's claims experience, or a predetermined percentage (e.g., 104%, 105%, 106%, to name a few) of the prior plan period's maximum claims liability.

For example, for plan period 2 (e.g., year 2 for an annual plan), the targeted medical expense amount may be set by the targeted medical expense module 130 at either a calculated maximum claims liability for plan period 2 or a percentage (e.g., 104%, 105%, 106%, to name a few) of the targeted medical expense amount for plan period 1, whichever is higher. Similarly, for plan period 3 (e.g., year 3 for an annual plan), the targeted medical expense amount may be set by the targeted medical expense module 130 at either a calculated maximum claims liability for plan period 3 or a percentage (e.g., 104%, 105%, 106%, to name a few) of the targeted medical expense amount for plan period 2, whichever is higher. In some embodiments, where a shared savings arrangement is set up for a multi-year period (e.g., 3 years), the targeted medical expenses may be adjusted by the targeted medical expense module 130 during a sub-period (e.g., each year). Where a shared savings arrangement is set up for a multi-year period (e.g., 3 years), the targeted medical expenses may remain the same for the entire multi-year period (e.g., the 3 years).

The targeted medical expense module 130 may establish the minimum percentage (e.g., 104%) and require that the subsequent plan year's targeted medical expense amount be at least equal to or greater than the minimum percentage of the prior plan year's targeted medical expense amount.

In embodiments, the targeted medical expense amount never decreases from the initial value set in the first year of the implementation. However, in such circumstances, it is desirable that the full funding level of the level-funding arrangement (e.g., sum of all monthly premium equivalents during a plan period) keep in pace with the periodic increase in the targeted medical expense amount so that it stays larger than the targeted medical expense amount.

The targeted medical expense amount may be re-negotiated between the plan sponsor and the provider or re-calculated by the targeted medical expense module 130 after the end of a plan period based at least in part on, for example, changes or adjustments in the provider's discount rate, the plan sponsor's claims experience, the provider's relevant market share, and/or other relevant parameters, to name a few.

The targeted medical expense module 130 may re-set the targeted medical expense amount based upon information or data input through an input device. Examples of an input device may include a keyboard, a touch screen, a removable memory, and other device or machine connected via a USB/PCI/FireWire/serial or other port or network connector. In embodiments, ftp transfer protocol may be used to transfer data via a network connector.

At or near the end of or after a plan period, the claims module 120 obtain directly or indirectly claims data for that period from the one or more electronic databases (e.g., database 105 in the system 100) storing the claims data and calculates a sum of all claims incurred or claims paid during that period. This sum may be provided manually or otherwise. The shared savings module 140 compares this sum of claims calculated by the claims module 120, or otherwise obtained, to the targeted medical expense amount for that plan period as set for the period or determined by the targeted medical expense module 130. To the extent the sum of the claims is less than the targeted medical expense amount, a surplus based at least in part on their difference may be shared in the form of shared savings at least in part with the provider and/or the TPA administering the plan. This shared savings may also potentially be shared with others.

The shared savings module 140 may calculate the surplus by taking the difference between the targeted medical expense amount and the sum of the claims incurred and/or claims paid during the plan period. If the resulting surplus is greater than a pre-set threshold value (e.g., $0), then portions of the surplus may be distributed among the plan sponsor, the provider, and/or the TPA administering the plan in the form of shared savings calculated by the shared savings module 140. For example, in embodiments, if the surplus meets the threshold, a first percentage (e.g., 50%) of the surplus may be for the plan sponsor and a second percentage (e.g., 50%) may be for the provider as the shared savings. Where the TPA is more involved in the plan, a first percentage (e.g., 50%) of the surplus may be distributed to a plan sponsor, a second percentage (e.g., 45%) of the surplus may be distributed to the provider and a third percentage (e.g., 5%) of the surplus may be distributed to the TPA, in the form of shared savings after the end of the plan period. The shared savings to the provider may be set at a various percentage (e.g., 10%, 25%, 50%, 75%, 80%, to name a few) of the surplus. It is understood that other percentages besides the examples illustrated herein can be used consistent with the letter and spirit of the invention.

The provider's percentage share in the shared savings may be calculated by the shared savings module 140 based at least in part on the provider's discount rate.

The percentage allocation of shared savings to the plan sponsor, the provider, and possibly others (e.g., TPA) may be calculated by the shared savings module 140 or negotiated between the provider and the plan sponsor based at least in part on, for example, the risk profile, demographics, the utilization rate, and/or the capture rate of the group.

The percentage allocation of shared savings may be determined by the shared savings module 140 based at least in part on, for example, the in-network or in-system utilization by the plan participants. For example, initially (e.g., in the first year of a shared savings arrangement), the provider may be apportioned a larger share in shared savings (e.g., 15% for the plan sponsor, 80% for the provider, and 5% for the TPA). In subsequent plan periods, data for the in-network or in-system utilization is analyzed by, for example, the shared savings module 140 and based at least in part on any increase in the in-network or in-system utilization by the plan participants, the percentage allocation of shared savings may be adjusted by the shared savings module 140 accordingly (e.g., 50% for the plan sponsor, 45% for the provider, and 5% for the TPA).

The shared savings module 140, in coordination with, for example, the provider discount rate module 150, may set the minimum limit (e.g., 45%) on the provider's percentage share in shared savings based at least in part on the provider's discount rate, the provider's profit and loss analysis, etc.

In embodiments, both the percentage allocation of shared savings determined by the shared savings module 140 and the provider's discount rate set by the provider discount rate module 130 are based at least in part on the in-network or in-system utilization. In embodiments, if the percentage allocation of shared savings is based at least in part on the in-network or in-system utilization, then the provider's discount rate is not.

The shared savings may potentially be shared with other entities too (e.g., a care management company) as an incentive, for example, to obtain shared savings.

The plan sponsor may take its portion of shared savings (if paid via level-funded agreement) back onto its books; or leave it with the TPA vendor administering the plan to offset future premium equivalents payments and/or stop-loss insurance premiums; or use it to establish a claim/premium reserve to offset future catastrophic claims.

If the targeted medical expense amount was set below the actual funding level (e.g., level funding) of the plan and if there are surplus funds left over at the end of the plan period from the portion of the level funding above the targeted medical expense amount, they may be refunded to the plan sponsor, or remain in an employer-established account to pay future claims, and would not be included in shared savings to the providers and the TPA.

On the other hand, in embodiments, if claims incurred or paid by the plan exceed the targeted medical expense amount, then there would be no surplus and thus no shared savings. For example, when the shared savings module 140 calculates a surplus equal to zero or a negative surplus, or a surplus less than some specified threshold amount, a zero shared saving response may be returned. Such no shared saving occurrence may trigger re-setting of the targeted medical expense amount at a higher level closer to the plan's maximum claims liability, or increased discounts by provider, or modification in healthcare plan benefits, or strategy for the next plan period. In embodiments, the maximum claims liability is expected regular claims cost plus a risk corridor up to the stop-loss point, which is typically between 110% and 125% of the expected regular claims cost. Since the plan sponsor would be funding the plan up to at least the maximum claims liability, any amounts in the risk corridor above the expected regular claims are already paid by the plan sponsor. Any amounts above the maximum claims liability in such embodiment would attribute to the stop-loss carrier.

The shared savings module 140 may assess savings relative to the full set of covered services for the group (e.g., all in-network or in-system services). Certain services may be excluded by the shared savings module 140 from the calculation of shared savings based at least in part on, for example, the risk profile and/or demographics of each group. For example, one or more of the following services may be excluded from the shared savings calculation by the shared savings module 140: organ transplants; catastrophic claims above a certain level (e.g., neo-natal infants); prescription medications (e.g., specialty medications) in toto or above a certain threshold; behavioral health; pediatric services; dental services, except for limited services covered by the plan; out-of-area services; and/or non-preventable inpatient and emergency department services, to name a few.

Claims relating to certain types of treatment (e.g., neo-natal infant, organ transplant, to name a few) that may exceed either an aggregate or specific stop-loss point may be excluded by the shared savings module 140 from the calculation of shared savings. This flexibility may permit the prevention of a single catastrophic claim from eliminating all or a major portion of the potential shared savings for the plan period. In embodiments, such arrangement may be made in consultation with the stop-loss carrier for the plan as to how the types of claims to be excluded from the shared savings calculation would attach to the stop-loss liability and how the service discounts under the shared savings program would potentially lower the stop-loss carrier's exposure.

The manners in which shared savings are calculated by the shared savings module 140 and the provider's discount rates are determined by the provider discount rate module 150 may be different for different self-insured plans. The manners in which shared savings are calculated by the shared savings module 140 and the provider's discount rates are determined by the provider discount rate module 150 may be different for different groups of plan participants within the same self-insured plan.

For a selected group of self-insured plans or plan participants within a self-insured plan, the provider's discount rate may be determined by the provider discount rate module 150 based at least in part on, for example, types of specific treatments or procedures, the Current Procedural Terminology (CPT) codes, bundled payments, and/or services, to name a few, which may be stored in the database 105. To a certain group of plans or plan participants within a plan, the provider may provide specific procedures (e.g., cardiology, anesthesiology, to name a few) for a discounted bundled payment, which may be determined by the provider discount rate module 150 based at least in part on, for example, the amount of volume requiring such procedures the group brings to the provider. For example, the provider may provide cardiology procedures to a specific group for a discounted bundled payment if the group sends at least a certain percentage (e.g., 100%, 90%, 80%, 50%, to name a few) of those requiring cardiology procedures to the provider. The provider may provide to a specific group, at a later time, a discounted amount for specific procedures performed to the group, which may be determined by, for example, the provider discount rate module 150 based at least in part on the amount of volume requiring such procedures the group has brought to the provider.

A specific set of treatments and procedures may be defined, for example, by the provider discount rate module 150 to be covered by the provider's discounts. A specific set of treatments and procedures may be defined, for example, by the provider discount rate module 150 to be excluded from the provider's discounts. For example, all in-network or in-system services may be covered by the provider's discounts except for a certain set of services such as normal maternity.

The plan sponsor or the provider may use the shared savings to encourage plan participants (e.g., employees under the self-insured plan) to participate in health promoting activities so that claims by the plan participants stay low compared to the targeted medical expense amount (thus generating further shared savings). For example, the plan sponsor or the provider may further distribute a portion of the shared savings to the plan participants in the form of subsidies to health club membership fees, participating in weight-control programs or other health promoting and/or preventive care programs.

Figure 3:
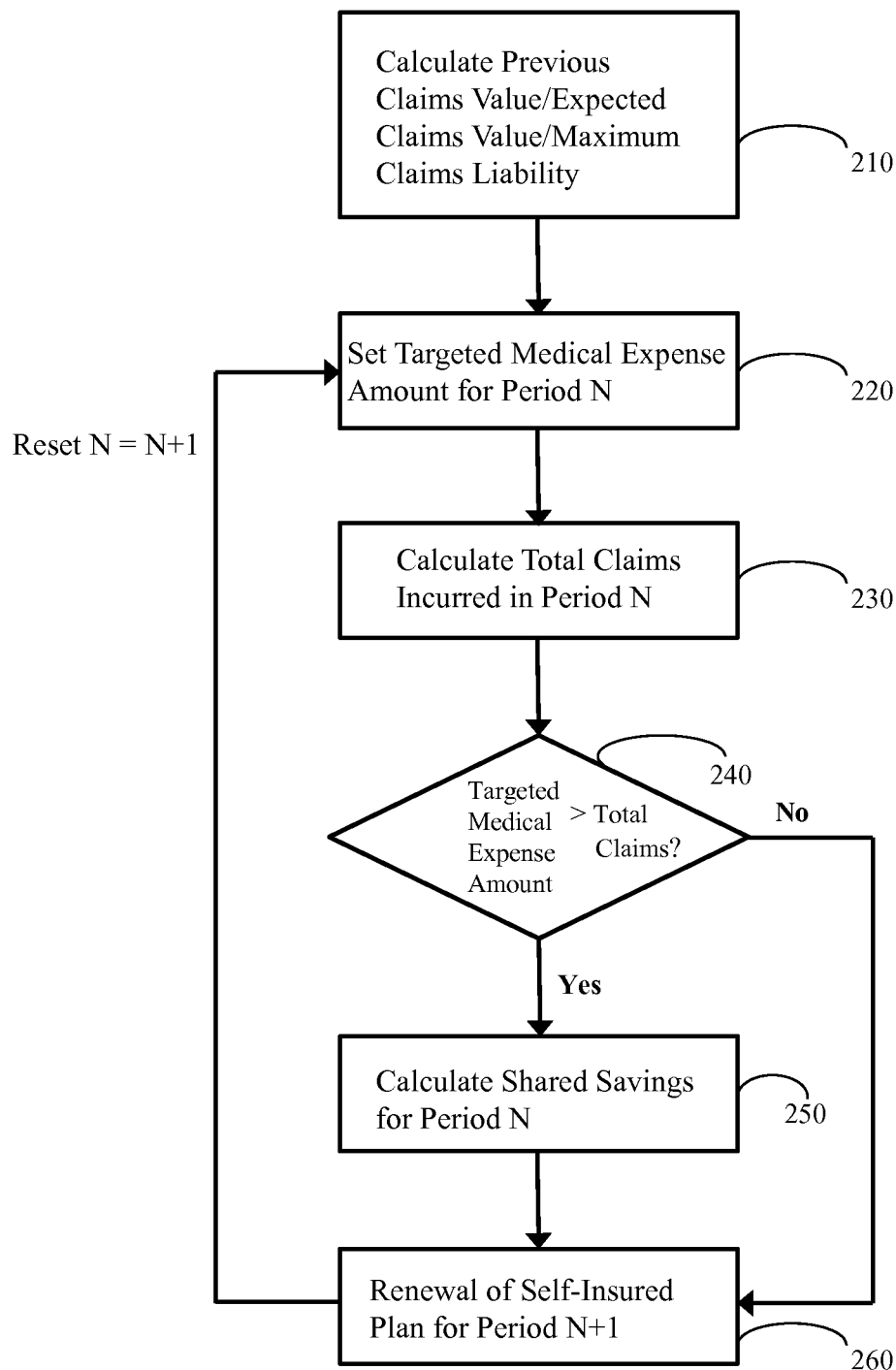
FIG. 3 is a flow chart of a method according to an exemplary embodiment of the present invention.

FIG. 3 is a flow chart of a method for calculating shared savings for a self-insured plan according to exemplary embodiments. These steps may be performed by a single computer or machine, or by different modules implemented over multiple computers or machines in one or more networks. One or more steps may be implemented in conjunction with one or more computers, including, for example, servers, hand held devices, portable computing devices, notebooks, computers, laptop computers, tablets, to name a few.

As illustrated in FIG. 3, by way of example, in step 210 the claims module 120 may calculate a Previous Claims Value, a sum of claims incurred or claims paid under a self-insured plan during the previous plan period (Period N−1). For example, in embodiments, the plan period for a self-insured plan may typically be on an annual basis starting on the first day of a calendar year or some other initiation date. Other length of plan periods may be used consistent with scope and spirit of the present invention. Data relating to the claims incurred or the claims paid during the previous plan period may be provided from external database or an external system or input manually individually or in total.

In step 210, the claims module 120 may calculate an Expected Claims Value, a sum of expected claims for the upcoming plan period based at least in part on, inter alia, prior claims history, medical history of plan participants, and/or other factors.

In step 210, the claims module 120 may calculate a maximum claims liability and an expected claims amount based at least in part on, for example, demographics, risk profile and/or the past claims experience (e.g., the claims experience for at least the last two years) of the group, to name a few. The data and information necessary for determining the maximum claims liability may come from the plan sponsor, its consultant/broker, its stop-loss insurer (if participating in a stop-loss program), to name a few. In step 220, the targeted medical expense module 130 may determine the targeted medical expense amount for the plan period based at least in part on the maximum claims liability. The targeted medical expense module 130 may set the targeted medical expense amount at the maximum claims liability level.

In step 220, the targeted medical expense module 130 may calculate the targeted medical expense amount for the period based at least in part on the Previous Claims Value for the previous plan period and/or Expected Claims Value for the upcoming plan period. For example, in an initial period, the targeted medical expense amount may be set at 90%, 95%, 97%, 98%, 100%, 105%, or some other percentage of the Previous Claims Value for the previous plan period or the Expected Claims Value for the upcoming plan period. The targeted medical expense value may be calculated using a weighted combination of these and/or other factors. The targeted medical expenses may be set manually, as a result of, e.g., a negotiation between the parties.

In step 220, the targeted medical expense module 130 may calculate the targeted medical expense amount based at least in part on at least one of the following parameters: (1) the provider's discounts on its services (e.g., provider reimbursement rate); (2) the medical expense (e.g., claims incurred or claims paid by the plan sponsor) during the previous plan period, or actuarially determined anticipated medical expense for the upcoming period in the event there is no data from the prior plan period; (3) the provider's market share in the relevant geographical location; (4) the group's demographics, including but not limited to age, gender, home zip code, salary, occupation, etc.; or (5) the nature of the group's business and standard industry code (SIC), to name a few. For example, in embodiments, based at least in part on the provider's 20% discount on its services and the provider's 40% market share in the hospital care in the plan sponsor's geographical area, the targeted medical expense amount may be set at 97% of the previous year's medical expense in the first year of the implementation of the system. In embodiment, the targeted medical expense amount can be set to the full funding level of a level funding plan, up to the aggregate stop-loss point. The targeted medical expense amount may be negotiable between the plan sponsor and the provider, and/or others.

In subsequent years, using step 220, the targeted medical expense module 130 may set or determine the targeted medical expense amount using one or more similar methodologies as discussed above. The targeted medical expense module 130 may periodically re-set the targeted medical expense amount in a predetermined manner. The targeted medical expense amount may be set or determined by the targeted medical expense module 130 by applying some desired percentage to the previous plan period's targeted medical expense amount. For example, in embodiments, the targeted medical expense amount for year 2 could be 100%, 103%, 105%, 107%, or 110% of the targeted medical expense amount for year 1. The percentage could be the same or different for each plan period.

In subsequent plan periods, the targeted medical expense amount may be re-set in step 220 by the targeted medical expense module 130 based at least in part on the maximum claims liability level calculated by, for example, the claims module 120 for the next plan period. The targeted medical expense amount may be re-set in step 220 by the targeted medical expense module 130 at the higher value of either the maximum claims liability for the next plan period calculated by, for example, the claims module 120 based at least in part on analysis and underwriting of the prior plan period's claims experience, or a predetermined percentage (e.g., 104%, 105%, 106%, to name a few) of the prior plan period's maximum claims liability.

For example, for plan period 2 (e.g., year 2 for an annual plan), the targeted medical expense amount may be set by the targeted medical expense module 130 at either a calculated maximum claims liability for plan period 2 or a percentage (e.g., 104%, 105%, 106%, to name a few) of the targeted medical expense amount for plan period 1, whichever is higher. Similarly, for plan period 3 (e.g., year 3 for an annual plan), the targeted medical expense amount may be set by the targeted medical expense module 130 at either a calculated maximum claims liability for plan period 3 or a percentage (e.g., 104%, 105%, 106%, to name a few) of the targeted medical expense amount for plan period 2, whichever is higher. In some embodiments, where a shared savings arrangement is set up for a multi-year period (e.g., 3 years), the targeted medical expenses may be adjusted by the targeted medical expense module 130 during a sub-period (e.g., each year). Where a shared savings arrangement is set up for a multi-year period (e.g., 3 years), the targeted medical expenses may remain the same for the entire multi-year period (e.g., the 3 years).

The targeted medical expense module 130 may establish the minimum percentage (e.g., 104%) and require that the subsequent plan year's targeted medical expense amount be at least equal to or greater than the minimum percentage of the prior plan year's targeted medical expense amount.

In step 230, at the end of or after the plan period, the claims module 120 may calculate the sum of all claims incurred and/or claims paid during the plan period. These amounts may be entered manually or otherwise provided.

In step 240, the shared savings module 140 may calculate the differences between the sum of the claims for the plan period calculated by the claims module 120 to the targeted medical expense amount set for that plan period. If the sum of the claims is less than the targeted medical expense amount, then the difference between the targeted medical expense amount and the sum of the claims represents a surplus based at least in part on which shared savings for the plan period may be determined. On the other hand, if the sum of the claims equals to or exceeds the targeted medical expense amount, then there is no surplus and step 250 for calculating shared savings is skipped.

In step 250, the shared savings module 140 may calculate shared savings for the plan period. Before calculating the shared savings, the shared saving module 140 may first check whether the surplus calculated from step 240 is larger than a pre-set threshold value, which can be set at, for example, $0, or an expected cost of processing shared savings. If the surplus meets the threshold, then the shared savings module 140 may calculate shared savings to the plan sponsor, the provider, and/or the TPA administering the plan based at least in part on portions of the surplus. For example, if the surplus meets the threshold, 25%, 65% and 10% of the surplus may be set by the shared savings module 140 to be shared savings to the plan sponsor, the provider, and the TPA, respectively.

Shared savings to the provider may be set at, e.g., 10%, 25%, 50%, 75%, or 80% of the surplus, to name a few, depending on the provider's proffered discount rates.

The provider's percentage share in the shared savings may be calculated by the shared savings module 140 based at least in part on the provider's discount rate.

The percentage allocation of shared savings to the plan sponsor, the provider, and possibly others (e.g., TPA) may be calculated by the shared savings module 140 or negotiated between the provider and the plan sponsor based at least in part on, for example, the risk profile, demographics, the utilization rate, and/or the capture rate of the group, to name a few.

The percentage allocation of shared savings may be determined by the shared savings module 140 based at least in part on, for example, the in-network or in-system utilization by the plan participants. For example, initially (e.g., in the first year of a shared savings arrangement), the provider may be apportioned a larger share in shared savings (e.g., 15% for the plan sponsor, 80% for the provider, and 5% for the TPA). In subsequent plan periods, data for the in-network or in-system utilization is analyzed by, for example, the shared savings module 140 and based at least in part on any increase in the in-network or in-system utilization by the plan participants, the percentage allocation of shared savings may be adjusted by the shared savings module 140 accordingly (e.g., 50% for the plan sponsor, 45% for the provider, and 5% for the TPA).

Both the percentage allocation of shared savings determined by the shared savings module 140 and the provider's discount rate set by the provider discount rate module 130 may be based at least in part on the in-network or in-system utilization. In embodiments, if the percentage allocation of shared savings is based at least in part on the in-network or in-system utilization, then the provider's discount rate is not.

The shared savings allotted to the TPA or others may similarly vary in different embodiments.

The results of the shared saving calculation may be provided to a memory and/or to an output device, such as a display, a printer, a removable memory, or other device or machine connected via a USB/PCI/FireWire/serial port or other network connector.

In step 260, the level-funding module 110 or some other module or system may confirm renewal of the relevant self-insured plan and establish a funding level (e.g., monthly premium equivalents) based at least in part on the maximum anticipated claims liability (e.g., expected regular claims plus a risk corridor up to the aggregate stop-loss point) for the next plan period. To ensure that there is a pool for shared savings and shared savings, it is desirable that the level-funding module 110 set the funding level for the upcoming plan period to be higher than the targeted medical expense amount (e.g., the targeted medical expense amount plus 2%, 4%, or 6%, to name a few), which would be re-set by the targeted medical expense module 130 in step 220. Upon renewal of the plan, the process goes back to step 220 to start over for the next plan period (Period N+1). Steps 230 through 260 may then be repeated to calculate shared savings, if any, for the next plan period.

Figure 4:
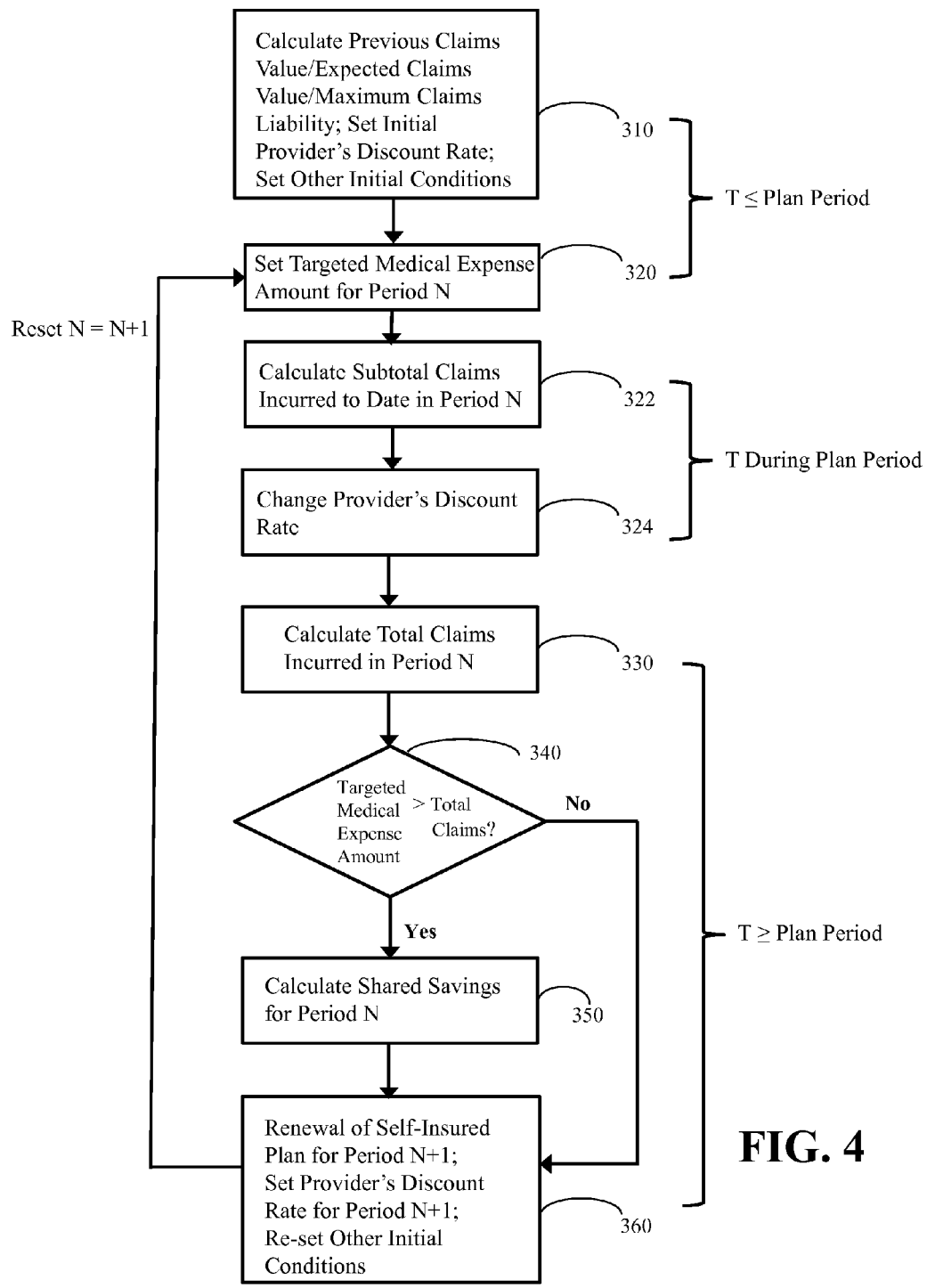
FIG. 4 is a flow chart of a method according to another exemplary embodiment of the present invention.

FIG. 4 is a flow chart of a method for calculating shared savings for a self-insured plan according to another exemplary embodiment. The embodiment described in FIG. 4 may provide a provider with more control over a self-insured plan by, for example, allowing the provider to monitor claims data (e.g., step 322) and/or change its discount rate (e.g., provider reimbursement rate) (e.g., step 324) during a plan period. This is significant because health care providers with extensive health-related data and pre-emptive and predictive health care management skills may be in a better position than others to control the claims level and optimize the shared savings for self-insured plans. Like the steps of the method shown in FIG. 3, the steps of the method shown in FIG. 4 may be performed by a single computer or machine, or by different modules implemented over multiple computers or machines in one or more networks. It is noted that in embodiments, steps 310, 320, 330, 340, 350 and 360 of the method shown in FIG. 4 may correspond to steps 210, 220, 230, 240, 250 and 260 in FIG. 3, respectively, and thus may share corresponding descriptions.

As indicated in FIG. 4, steps 310 and 320 of the method may be performed at or before the beginning of a plan period. In step 310, the claims module 120 may calculate a Previous Claims Value, a sum of claims incurred or claims paid under a self-insured plan during the previous plan period (Period N−1), or an Expected Claims Value, a sum of actuarially assumed claims for the upcoming plan period (Period N). Those values may be provided manually or otherwise. In step 310, the claims module 120 may calculate a maximum claims liability and an expected claims amount based at least in part on, for example, demographics, risk profile and/or the past claims experience (e.g., the claims experience for at least the last two years) of the group.

In addition, the initial rate of the provider's discounts on its services may be set in step 310. The discount rate may be determined by a provider discount rate module 150 in FIG. 2. The provider discount rate module 150 may initially establish a baseline discount rate (e.g., 5%, 10%, 15%, to name a few) for the provider's services.

Certain initial conditions for determining the provider's discount rates and/or for calculating shared savings (e.g., in step 350) may be set in step 310. One or more of such initial conditions may be re-set in step 360 based at least in part on the claims history and the rate of utilization of the provider during the past plan period.

In step 310, the shared savings module 140 may initially determine to assess savings relative to the full set of covered services for the group (e.g., all in-network or in-system services). In step 310, certain services may be excluded by the shared savings module 140 from the calculation of shared savings based at least in part on, for example, the risk profile and/or demographics of each group. For example, one or more of the following services may be excluded from the shared savings calculation by the shared savings module 140 in step 310: organ transplants; catastrophic claims above a certain level (e.g., neo-natal infants); prescription medications (e.g., specialty medications) in toto or above a certain threshold; behavioral health; pediatric services; dental services, except for limited services covered by the plan; out-of-area services; and/or non-preventable inpatient and emergency department services, to name a few.

In step 310 claims relating to certain types of treatment (e.g., neonatal infant, organ transplant, to name a few) that may exceed either an aggregate or specific stop-loss point may be excluded by the shared savings module 140 from the calculation of shared savings. This flexibility may permit, for example, the prevention of a single catastrophic claim from eliminating all or a major portion of the potential shared savings for the plan period. Such arrangement may be made in consultation with the stop-loss carrier for the plan as to how the types of claims to be excluded from the shared savings calculation would attach to the stop-loss liability and how the service discounts under the shared savings program would potentially lower the stop-loss carrier's exposure.

Figure 4A:
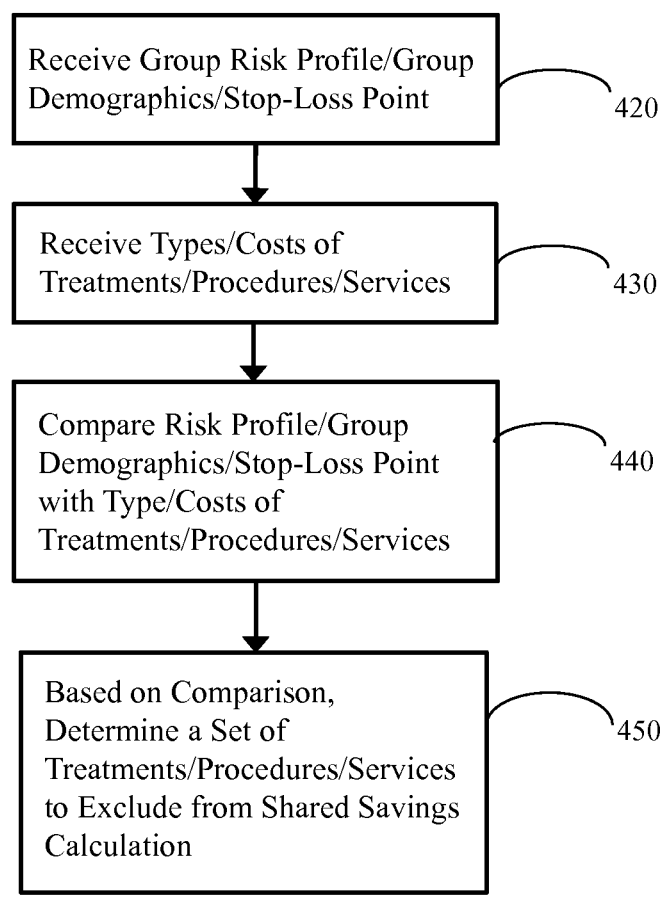
FIGS. 4A and 4B are flow charts of exemplary sub-steps for the flow chart in FIG. 4 according to yet another exemplary embodiment of the present invention.

FIG. 4A shows a flow chart of exemplary sub-steps that, for example, the shared savings module 140 may perform as part of step 310 in FIG. 4 to initially determine one or more specific treatments, procedures, and/or services to be excluded from the calculation of shared savings. In step 420, the shared savings module 140 may receive or retrieve from the database 105, other external database, and/or other modules in the system 100 certain information and data relating to a specific group of self-insured plans or participants in the same self-insured plan, such as the risk profile of the group, demographics of the group, aggregate or specific stop-loss point for the group or the plan, to name a few. In step 430, the shared savings module 140 may receive or retrieve from the database 105, other external database, and/or other modules in the system 100 certain information and data relating to treatments, procedures, and/or services provided by the provider, such as their types and costs, to name a few. In step 440, the shared savings module 140 may compare the information and data relating to the specific group received or retrieved in step 420 and the information and data relating to the provider's treatments, procedures, and/or services received or retrieved in step 430. In step 450, based at least in part on the comparison performed in step 440, the shared savings module 140 may determine, for the specific group, one or more specific treatments, procedures, and/or services (e.g., neonatal infant, organ transplant, behavioral health, to name a few) provided by the provider to be excluded from the calculation of shared savings. In embodiments, one or more of the exemplary sub-steps of FIG. 4A may be performed by one or more modules other than the shared savings module 140.

For a selected group of self-insured plans or plan participants within a self-insured plan, the provider discount rate module 150 may set the provider's initial discount rate in step 310 based at least in part on, for example, types of specific treatments or procedures, the Current Procedural Terminology (CPT) codes, bundled payments, and/or services, to name a few, which may be stored in the database 105. To a certain group of plans or plan participants within a plan, the provider discount rate module 150 may determine in step 310 to provide specific procedures (e.g., cardiology, anesthesiology, to name a few) for a discounted bundled payment based at least in part on, for example, the amount of volume requiring such procedures the group brings to the provider. For example, the provider may decide to provide cardiology procedures to a specific group for a discounted bundled payment if the group sends at least a certain percentage (e.g., 100%, 90%, 80%, 50%, to name a few) of those requiring cardiology procedures to the provider. The provider may re-set the discount policy for the upcoming plan period in step 360 so that it will provide specific procedures for a discounted bundled payment based at least in part on, for example, the amount of volume requiring such procedures the group brought to the provider during the prior plan period. The provider discount rate module 150 may decide, in step 310, to provide to a specific group, at a later time (e.g., after a pre-set time period, at the end of the plan period, to name a few), a discounted amount for specific procedures performed to the group based at least in part on the amount of volume requiring such procedures the group has brought to the provider during the given time period (e.g., a pre-set time period, a plan period, to name a few).

In step 310, the provider discount rate module 150 may initially define a specific set of treatments and procedures to be covered by the provider's discounts. The provider discount rate module 150 may initially define, in step 310, a specific set of treatments and procedures to be excluded from the provider's discounts. For example, all in-network or in-system services may be covered by the provider's discounts except for a certain set of services such as normal maternity.

Figure 4B:
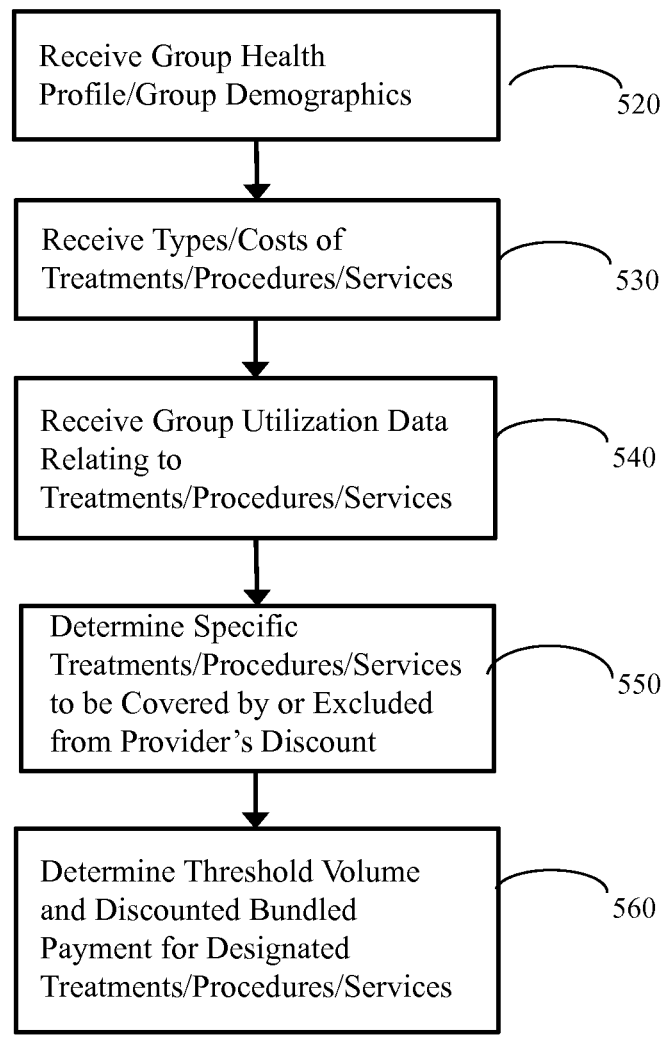

FIG. 4B shows a flow chart of exemplary sub-steps that, for example, the provider discount rate module 150 may perform as part of step 310 in FIG. 4 to initially determine one or more specific treatments, procedures, and/or services which may be covered by or excluded from the provider's discount and/or which the provider may provide to a specific group for a discounted bundled payment. In step 520, the provider discount rate module 150 may receive or retrieve from the database 105, other external database, and/or other modules in the system 100 certain information and data relating to a specific group of self-insured plans or participants in the same self-insured plan, such as the health profile of the group, demographics of the group, to name a few. In step 530, the provider discount rate module 150 may receive or retrieve from the database 105, other external database, and/or other modules in the system 100 certain information and data relating to treatments, procedures, and/or services provided by the provider, such as their types and costs, the associated CPT codes, to name a few. In step 540, the provider discount rate module 150 may receive or retrieve from the database 105, other external database, and/or other modules in the system 100 data relating to the group's utilization of the treatments, procedures, and/or services provided by the provider. In step 550, based at least in part on analyzing and/or comparing the information and data received or retrieved in one or more of steps 520, 530 and 540, the provider discount rate module 150 may determine a set of specific treatments, procedures, and/or services provided by the provider that may be covered by or excluded from the provider's discount.

In step 560 of FIG. 4B, based at least in part on analyzing and/or comparing the information and data received or retrieved in one or more of steps 520, 530 and 540, the provider discount rate module 150 may designate one or more specific treatments, procedures, and/or services provided by the provider (e.g., cardiology, anesthesiology, to name a few) and set the associated threshold volume and discounted bundled payment for the specific group. The provider may provide the specific treatment(s), procedure(s), and/or service(s) (e.g., designated in step 560) to the group for a discounted bundled payment (e.g., set in step 560) if the group sends to the provider at least the threshold volume of patients (e.g., set in step 560) to get the designated treatment(s), procedure(s), and/or service(s). The threshold volume may be defined as, for example, a pre-set percentage, such as 100%, 90%, 80%, 50%, to name a few, of those requiring the designated treatment, procedure, and/or service in the group who are sent to the provider. The threshold volume may be defined in terms of, for example, a pre-set number of patients, such as 10, 50, 100 patients, to name a few, who are sent to the provider to get the designated treatment, procedure, and/or service. In embodiments, one or more of the exemplary sub-steps of FIG. 4B may be performed by one or more modules other than the provider discount rate module 150.

Returning to FIG. 4, in subsequent plan periods (e.g., at step 360) and/or even during a given plan period (e.g., step 324), the provider discount rate module 150 may adjust the discount rate based at least in part on, for example, the in-network or in-system utilization by the plan participants. Such in-network or in-system utilization may be determined (e.g., by the claims module 120) based at least in part on, for example, claim count, claim volume, number of hospitalizations, number of visits involving the in-network or in-system resources, and/or number of plan members using the in-network or in-system services compared to the number of members not using the in-network or in-system resources, to name a few. How the in-network or in-system utilization rate is determined may be negotiated between the provider and the plan sponsor. For example, the provider discount rate module 150 may adjust the provider's discount rate to (i) a first percentage (e.g. 7%) if the utilization of a specified provider by the plan participants is determined to be within a first specified range (e.g., between 50% and 59.9%) as measured in against total medical cost per member per month (PMPM); (ii) a second percentage (e.g., 10%) if the utilization of the specified provider is determined to be within a second specified range (e.g., between 60% and 74.9%) as measured in against total medical cost PMPM; (iii) a third percentage (e.g., 15%) if the utilization of the specified provider is determined to be within a third specified range (e.g., over 75%) as measured in against total medical cost PMPM. In embodiments, a different number of percentages and specified ranges, as well as different amounts, may be used or negotiated.

This adjustment of the provider's discount rate based on the in-network or in-system utilization rate may be performed by the provider discount rate module 150 periodically during a given plan period (e.g., at step 324), such as monthly, quarterly, every 6 months, to name a few.

In embodiments, the provider discount rate module 150 does not set a discount rate up front at the beginning of each plan period (e.g., at step 310). Instead, after a pre-set time period (e.g., every month, every 3 months, every 4 months, every 6 months, at the end of a plan year, to name a few), for example, in step 324 and/or step 360, a discount rate may be determined by the provider discount rate module 150 based at least in part on, for example, the in-network or in-system utilization by the plan participants during this time period. The discount rate determined by the provider discount rate module 150 may then be applied by, for example, the claims module 120 to the provider's claims for this time period. The discounted amounts may be then subtracted (e.g., by the claims module 120) from the provider's pending claims to the plan sponsor for this time period or refunded to the plan sponsor if the provider's claims have already been paid by the plan sponsor. Such in-network or in-system utilization may be determined (e.g., by the claims module 120) based at least in part on, for example, claim count, claim volume, number of hospitalizations, number of visits involving the in-network or in-system resources, and/or number of plan members using the in-network or in-system services compared to the number of members not using the in-network or in-system resources, to name a few. The in-network or in-system utilization rate may be determined based on negotiation between the provider and the plan sponsor.

For example, the provider's discount rate may be determined by the provider discount rate module 150 to be at (i) a first percentage (e.g., 7%) if the utilization of a specified provider by the plan participants may be determined to be within a first specified range (e.g., between 50% and 59.9%) as measured in against total medical cost per member per month (PMPM); (ii) a second percentage (e.g., 10%) if the utilization of the specified provider may be determined to be within a second specified range (e.g., between 60% and 74.9%) as measured in against total medical cost PMPM; (iii) a third percentage (e.g., 15%) if the utilization of the specified provider may be determined to be within a third specified range (e.g., over 75%) as measured in against total medical cost PMPM or some other milestone. The provider's discount rate may be set by the provider discount rate module 150 to be at a baseline percentage (e.g., 1%, 2%, 5%, to name a few) if the utilization of the specified provider is determined to be below a certain threshold (e.g., 50%) as measured in against total medical cost PMPM. In embodiments, a different number of percentages and specified ranges, as well as different amounts, or different milestones may be used or negotiated.

In step 320, the targeted medical expense module 130 may determine the targeted medical expense amount for the plan period based at least in part on the maximum claims liability. The targeted medical expense module 130 may set the targeted medical expense amount at the maximum claims liability level.

In step 320, the targeted medical expense module 130 may calculate the targeted medical expense amount for the period based at least in part on the Previous Claims Value for the previous plan period and/or Expected Claims Value for the upcoming plan period. For example, in an initial period, the targeted medical expense amount may be set at 90%, 95%, 97%, 98%, 100%, 105%, or some other percentage of the Previous Claims Value for the previous plan period or the Expected Claims Value for the upcoming plan period. The targeted medical expense value may be calculated using a weighted combination of these and/or other factors.

In step 320, the targeted medical expense module 130 may set the targeted medical expense amount for the plan period based at least in part on at least one or more of the following parameters: (1) the provider's discount rate; (2) the Previous Claims Value or the Expected Claims Value; (3) the provider's market share in the relevant geographical location; (4) the group's demographics, including but not limited to age, gender, home zip code, salary, occupation, etc.; or (5) the nature of the group's business and standard industry code (SIC), to name a few.

In step 322, which may be performed at any time during the plan period (e.g., after each one of one or more pre-set portions of the plan period, at one or more points of the plan period, periodically during the plan period, etc.), the claims module 120 may retrieve data, in real time or otherwise, relating to claims incurred and/or claims paid to date from one or more internal or external databases and calculate a subtotal of the claims incurred and/or claims paid to date. Based at least in part on the calculated subtotal, the provider may be able to estimate expected medical expenses for the entire plan period as well as the amount of expected shared savings (e.g., a projected value of shared savings) or the lack thereof.

In step 324, which may be performed at any time during the plan period by, for example, the provider discount rate module 150, the rate of the provider's discounts on its services (e.g., provider reimbursement rate) may change (e.g., from 20% to 30%) or adjusted in response to, for example, the provider's evaluation of the claims data to date and/or the projected value of shared savings. Such change in the provider's discount rate during the plan period may impact the total amount of claims incurred during the plan period and may be reflected in the claims data processed by the claims module in step 330. For example, in embodiments, because of the change in the provider's discount rate, the targeted medical expense amount may not be exceeded by the claims incurred during the plan period, thereby generating shared savings for the plan sponsor and the provider. By allowing such flexibility, the present invention may allow optimization of shared savings for both the plan sponsor and the provider.

Changes in the provider's discount rate may be based at least in part on other parameters, such as, but not limited to, (i) a significant change in demographics of the group; (ii) a significant change in the in-network or in-system utilization by the group; (iii) a purchase, merger, joint venture, or acquisition of the group participating in a shared savings arrangement; (iv) the provider's expansion, acquisition, joint venture, partnership, and/or network integration providing additional services and providers to the Plan Sponsor, which was not known at the time shared savings arrangement started; (v) additional services now within the provider's capabilities; (vi) availability of specific services; (vii) changes in ERISA and/or insurance law requiring changes to provider's services; and/or (viii) changes to the requirements under the Health Care Reform law and/or the development of government-sponsored programs (e.g., accountable care organizations or ACOs) that inhibit the appropriate execution of this arrangement, to name a few.

The change of the provider's discount rate may be calculated dynamically and automatically, and either periodically, or after each one of one or more pre-set portions of the plan period, or at one or more points in non-periodic intervals, or upon demand, during the plan period by, for example, one or more computer modules such as the provider discount rate module 150. The provider's discount rate may also be altered manually. The provider's discount rate may be applied to each of the claims as submitted (e.g., dynamic adjustment) or after the fact to previously submitted claims (e.g., retroactive adjustment).

In step 330, which is preferably performed at the end of or after the plan period, the claims module 120 may calculate the sum of all claims incurred during the plan period.

In step 340, the shared savings module 140 may compare the sum of the claims incurred and/or claims paid for the plan period calculated by the claims module 120 to the targeted medical expense amount set for that plan period. If the sum of the claims is less than the targeted medical expense amount, then the difference between the targeted medical expense amount and the sum of the claims represents a surplus based at least in part on which shared savings for the plan period may be determined. On the other hand, if the sum of the claims equals to or exceeds the targeted medical expense amount, then there is no surplus and step 350 for calculating shared savings is skipped.

In step 350, the shared savings module 140 may calculate shared savings to the plan sponsor, the provider, and/or the TPA and/or others for the plan period, and the results of the shared saving calculation may be provided to a memory and/or to an output device.

In step 360, the level-funding module 110 or some other module or system may confirm renewal of the relevant self-insured plan and establish a funding level (e.g., monthly premium equivalents) based at least in part on the maximum anticipated claims liability (e.g., expected regular claims plus a risk corridor up to the aggregate stop-loss point) for the next plan period.

In addition, in step 360, the provider's discount rate may be re-set by the provider discount rate module 150 based at least in part on, for example, the in-network or in-system utilization by the plan participants as discussed above, or re-negotiated between the plan sponsor and the provider. The re-set discount rate may be taken into account by the targeted medical expense module 130 when re-setting the targeted medical expense amount for the next plan period in step 320. Upon renewal of the plan, the process goes back to step 320 to start over for the next plan period (Period N+1). Steps 330 through 360 are then repeated to calculate shared savings, if any, for the next plan period.

Another exemplary embodiment of the present invention relates to a system for calculating shared savings for a self-insured plan. The system may comprise an input device, an output device, a memory, an electronic database for storing data relating to claims incurred under the self-insured plan, a claims module, a targeted medical expense module, a shared savings module, and a provider discount rate module. The claims module may be programmed to calculate a maximum claims liability for a plan period, retrieve data relating to claims incurred during the plan period from the electronic database, calculate a sum of the claims, and store the sum of the claims in the memory. The targeted medical expense module may be programmed to determine a targeted medical expense amount based at least in part on a maximum claims liability, and store the targeted medical expense amount in the memory. The targeted medical expense amount may be set at the beginning of the plan period and stay fixed during the plan period. The shared savings module may be programmed to retrieve the sum of the claims and the targeted medical expense amount from the memory, compare the sum of the claims to the targeted medical expense amount, calculate a shared saving for a provider based at least in part on in-system/in-network utilization by plan participants, only if the sum of the claims is less than the targeted medical expense amount, and provide the value of the calculated shared saving to the output device. The provider discount rate module may be programmed to set the discount rate for the provider's services at the beginning of each plan period and change the provider's discount rate during the plan period based at least in part on claims incurred to date during the plan period and/or in-system/in-network utilization by plan participants during the plan period.

The claims module of the system may be further programmed to retrieve data relating to the claims incurred during the prior plan period from the electronic database, calculate the sum of the claims incurred, and store it in the memory; and the targeted medical expense module may be further programmed to retrieve the sum of the claims incurred during the prior plan period from the memory and set the targeted medical expense amount at a predetermined percentage (e.g., 90%, 95%, 97%, 98%, 100%, 105%, to name a few) of the sum of the claims made to the plan sponsor during the prior plan period.

The targeted medical expense module of the system may be further programmed to re-set the targeted medical expense amount after the end of a plan period based at least in part on a maximum claims liability calculated for the next plan period or a predetermined percentage (e.g., 100%, 104%, 105%, 106%, to name a few) of the targeted medical expense amount for the plan period.

The shared savings module of the system may be further programmed to calculate the shared saving only if a difference between the targeted medical expense amount and the sum of the claims is greater than a threshold value.

The shared savings module may be further programmed to calculate the shared saving to the provider to be a percentage (e.g., 45%, 50%, 80%, to name a few) of a difference between the targeted medical expense amount and the sum of the claims incurred. The shared savings module may be further programmed to determine the percentage based at least in part on in-system/in-network utilization by plan participants.

Yet another exemplary embodiment of the present invention relates to a method for calculating shared savings for a self-insured plan. The method may comprise the following steps: (i) determining, by one or more computers, a targeted medical expense amount for a plan period based at least in part on a maximum claims liability for the plan period; (ii) changing during the plan period, by the one or more computers, the discount rate for the provider's services based at least in part on in-system/in-network utilization by plan participants and/or claims incurred to date; (iii) retrieving, by the one or more computers, data for claims incurred during the plan period from an electronic database operatively coupled to the one or more computers; (iv) calculating, by the one or more computers, a sum of the claims; (v) comparing, by the one or more computers, the sum of the claims to the targeted medical expense amount; (vi) calculating, by the one or more computers, a shared saving to a provider for the plan period based at least in part on in-system/in-network utilization by plan participants, only if the sum of the claims is less than the targeted medical expense amount; and (vii) providing, to an output device by the one or more computers, the calculated shared saving value, wherein the output device is operatively connected to the one or more computers.

The step of determining a targeted medical expense amount may be performed at the beginning of the plan period and the targeted medical expense amount may stay fixed during the plan period.

The method may further include the step of re-setting the targeted medical expense amount after the end of a plan period based at least in part on a maximum claims liability calculated for the next plan period or a predetermined percentage (e.g., 100%, 104%, 105%, 106%, to name a few) of the targeted medical expense amount for the plan period.

The step of calculating the shared saving to the provider may be performed only if a difference between the targeted medical expense amount and the sum of the claims is greater than a threshold value.

The shared saving to the provider may be set at a percentage (e.g., 45%, 50%, 80%, to name a few) of a difference between the targeted medical expense amount and the sum of the claims incurred. The percentage may be determined based at least in part on in-system/in-network utilization by plan participants.

The step of changing the discount rate may comprise the steps of retrieving, from the electronic database by the one or more computers, data for claims incurred to date; calculating, by the one or more computers, a subtotal of the claims incurred to date to the plan sponsor; and changing, by the one or more computers, the discount rate for the provider's services based at least in part on analysis of the subtotal.

The step of determining a targeted medical expense amount may comprise the steps of retrieving, from the electronic database by the one or more computers, data for the claims incurred during the prior plan period; calculating, by the one or more computers, a sum of the claims made to the plan sponsor during the prior plan period; and setting, by the one or more computers, the targeted medical expense amount at a predetermined percentage (e.g., 90%, 95%, 97%, 98%, 100%, 105%, to name a few) of the sum of the claims made to the plan sponsor during the prior plan period.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A computer implemented method comprising:
   (a) maintaining, by a computer system including at least one computer, a database stored in a memory comprising:
      (1) electronic claims data related to claims incurred by a plurality of respective plan participants in a self-insured healthcare plan;
      (2) electronic utilization data related to utilization of in-network or in-system healthcare providers by the plurality of respective plan participants;
      (3) electronic targeted medical expense data related to a targeted medical expense amount for a plan period of the self-insured healthcare plan;
      (4) electronic healthcare provider discount rate data related to a healthcare provider discount rate;
   (b) setting, by the computer system, the targeted medical expense amount;
   (c) after each quarter of the plan period, determining, by the computer system, the utilization data for the quarter based at least in part on:
      (1) the plan participants' claim counts involving the in-network or in-system healthcare providers during the quarter,
      (2) the plan participants' claim volume involving the in-network or in-system healthcare providers during the quarter,
      (3) a number of the plan participants' hospitalizations involving the in-network or in-system healthcare providers during the quarter,
      (4) a number of the plan participants' visits to the in-network or in-system healthcare providers during the quarter, and
      (5) a number of the plan participants using the in-network or in-system healthcare providers compared to a number of the plan participants not using the in-network or in-system healthcare providers during the quarter;
   (d) adjusting, by the computer system, the healthcare provider discount rate based at least in part on the utilization data for the quarter;
   (e) adjusting, by the computer system, the claims incurred by the plurality of respective plan participants during the each quarter of the plan period based at least in part on the corresponding adjusted healthcare provider discount rate so that the adjusted claims are controlled by the healthcare provider discount rate; and
   (f) processing, by the computer system, pending claims of the in-network or in-system healthcare providers for the quarter based at least in part on the adjusted claims.

2. The computer implemented method of claim 1, further comprising:
   (g) after the end of the plan period, calculating, by the computer system, the sum of the claims, including the adjusted claims, incurred by the plurality of respective plan participants during the plan period;
   (h) comparing, by the computer system, the sum with the targeted medical expense amount to calculate a surplus; and
   (i) determining, by the computer system, shared savings based at least in part on the surplus.

3. The computer implemented method of claim 1, wherein the step of setting the targeted medical expense amount comprises:
   determining, by the computer system, one or more of a maximum claims liability and an expected claims amount; and
   adjusting, by the computer system, the targeted medical expense amount for the plan period based at least in part on the one or more of a maximum claims liability and an expected claims amount.

4. The computer implemented method of claim 1, further comprising collecting the utilization data in real time during the plan period.

5. The computer implemented method of claim 1, further comprising:
   during the plan period, collecting, by the computer system, the claims data;
   at each time in one or more points during the plan period, calculating, by the computer system, an expected claims value for the plan period based at least in part on the subtotal of the claims data collected to date;
   calculating, by the computer system, a projected value of shared savings by comparing the expected claims value with the targeted medical expense amount; and
   adjusting, by the computer system, the healthcare provider discount rate based at least in part on the projected value of shared savings.

6. A computer implemented method comprising:
(a) maintaining, by a computer system including at least one computer, a database stored in a memory comprising:
  (1) electronic claims data related to claims incurred by a plurality of respective plan participants in a self-insured healthcare plan;
  (2) electronic utilization data related to utilization of in-network or in-system healthcare providers by the plurality of respective plan participants;
  (3) electronic targeted medical expense data related to a targeted medical expense amount for a plan period of the self-insured healthcare plan;
  (4) electronic healthcare provider discount rate data related to a healthcare provider discount rate;
(b) setting, by the computer system, the targeted medical expense amount;
(c) during the plan period, obtaining, by the computer system, data related to each one of claims incurred by the plurality of respective plan participants;
(d) after each quarter of the plan period, determining, by the computer system, the utilization data for the quarter based at least in part on:
  (1) the plan participants' claim counts involving the in-network or in-system healthcare providers during the quarter,
  (2) the plan participants' claim volume involving the in-network or in-system healthcare providers during the quarter,
  (3) a number of the plan participants' hospitalizations involving the in-network or in-system healthcare providers during the quarter,
  (4) a number of the plan participants' visits to the in-network or in-system healthcare providers during the quarter, and
  (5) a number of the plan participants using the in-network or in-system healthcare providers compared to a number of the plan participants not using the in-network or in-system healthcare providers during the quarter;
(e) adjusting, by the computer system, the healthcare provider discount rate based at least in part on the utilization data for the quarter;
(f) adjusting, by the computer system, the each one of the claims based at least in part on the corresponding adjusted healthcare provider discount rate so that the adjusted claims are controlled by the healthcare provider discount rate; and
(g) processing, by the computer system, pending claims of the in-network or in-system healthcare providers for the quarter based at least in part on the adjusted claims.

7. The computer implemented method of claim 6, further comprising:
(h) after the end of the plan period, calculating, by the computer system, the sum of the adjusted claims incurred by the plurality of respective plan participants during the plan period;
(i) comparing, by the computer system, the sum with the targeted medical expense amount to calculate a surplus; and
(j) determining, by the computer system, shared savings based at least in part on the surplus.

8. The computer implemented method of claim 6, wherein the step of setting the targeted medical expense amount comprises:
determining, by the computer system, one or more of a maximum claims liability and an expected claims amount; and
adjusting, by the computer system, the targeted medical expense amount for the plan period based at least in part on the one or more of a maximum claims liability and an expected claims amount.

9. The computer implemented method of claim 6, further comprising collecting the utilization data in real time during the plan period.

10. The computer implemented method of claim 6, further comprising:
during the plan period, collecting, by the computer system, the claims data;
at each time in one or more points during the plan period, calculating, by the computer system, an expected claims value for the plan period based at least in part on the subtotal of the claims data collected to date;
calculating, by the computer system, a projected value of shared savings by comparing the expected claims value with the targeted medical expense amount; and
adjusting, by the computer system, the healthcare provider discount rate based at least in part on the projected value of shared savings.

11. A computer system comprising:
one or more memories;
one or more processors operatively connected to the one or more memories; and
one or more computer readable media operatively connected to the one or more processors and having stored thereon computer instructions for carrying out the steps of:
(a) maintaining, by the computer system, a database stored in the one or more memories, the database comprising:
  (1) electronic claims data related to claims incurred by a plurality of respective plan participants in a self-insured healthcare plan;
  (2) electronic utilization data related to utilization of in-network or in-system healthcare providers by the plurality of respective plan participants;
  (3) electronic targeted medical expense data related to a targeted medical expense amount for a plan period of the self-insured healthcare plan;
  (4) electronic healthcare provider discount rate data related to a healthcare provider discount rate;
(b) setting, by the computer system, the targeted medical expense amount;
(c) during the plan period, obtaining, by the computer system, data related to each one of claims incurred by the plurality of respective plan participants;
(d) after each quarter of the plan period, determining, by the computer system, the utilization data for the quarter based at least in part on:
  (1) the plan participants' claim counts involving the in-network or in-system healthcare providers during the quarter,
  (2) the plan participants' claim volume involving the in-network or in-system healthcare providers during the quarter,
  (3) a number of the plan participants' hospitalizations involving the in-network or in-system healthcare providers during the quarter,
  (4) a number of the plan participants' visits to the in-network or in-system healthcare providers during the quarter, and (5) a number of the plan participants using the in-network or in-system healthcare providers compared to a number of the plan participants not using the in-network or in-system healthcare providers during the quarter;

(e) adjusting, by the computer system, the healthcare provider discount rate based at least in part on the utilization data for the quarter;

(f) adjusting, by the computer system, the each one of the claims based at least in part on the corresponding adjusted healthcare provider discount rate so that the adjusted claims are controlled by the healthcare provider discount rate; and (g) processing, by the computer system, pending claims of the in-network or in-system healthcare providers for the quarter based at least in part on the adjusted claims.

12. The computer system of claim 11, wherein the computer instructions further carry out the steps of:

(h) after the end of the plan period, calculating, by the computer system, the sum of the adjusted claims incurred by the plurality of respective plan participants during the plan period;

(i) comparing, by the computer system, the sum with the targeted medical expense amount to calculate a surplus; and (j) determining, by the computer system, shared savings based at least in part on the surplus.

13. The computer system of claim 11, wherein the step of setting the targeted medical expense amount comprises:

determining, by the computer system, one or more of a maximum claims liability and an expected claims amount; and adjusting, by the computer system, the targeted medical expense amount for the plan period based at least in part on the one or more of a maximum claims liability and an expected claims amount.

14. The computer system of claim 11, wherein the computer instructions further carry out the step of collecting the utilization data in real time during the plan period.

15. The computer system of claim 11, wherein the computer instructions further carry out the steps of:

during the plan period, collecting, by the computer system, the claims data;

at each time in one or more points during the plan period, calculating, by the computer system, an expected claims value for the plan period based at least in part on the subtotal of the claims data collected to date;

calculating, by the computer system, a projected value of shared savings by comparing the expected claims value with the targeted medical expense amount; and adjusting, by the computer system, the healthcare provider discount rate based at least in part on the projected value of shared savings.

* * * * *